(12) United States Patent
Kurihashi

(10) Patent No.: US 10,996,063 B2
(45) Date of Patent: May 4, 2021

(54) CONTROL DEVICE OF HYBRID VEHICLE

(71) Applicant: TOYOTA JIDOSHA KABUSHIKI KAISHA, Toyota (JP)

(72) Inventor: Sui Kurihashi, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 191 days.

(21) Appl. No.: 16/297,825

(22) Filed: Mar. 11, 2019

(65) Prior Publication Data

US 2019/0323848 A1    Oct. 24, 2019

(30) Foreign Application Priority Data

Apr. 19, 2018 (JP) .............................. JP2018-080799

(51) Int. Cl.
| | |
|---|---|
| *G01C 21/34* | (2006.01) |
| *G01C 21/36* | (2006.01) |
| *B60L 58/12* | (2019.01) |
| *B60L 53/24* | (2019.01) |

(52) U.S. Cl.
CPC .......... *G01C 21/3415* (2013.01); *B60L 53/24* (2019.02); *B60L 58/12* (2019.02); *G01C 21/3469* (2013.01); *G01C 21/3605* (2013.01)

(58) Field of Classification Search
CPC ................................................ G01C 21/3415
See application file for complete search history.

(56) References Cited

U.S. PATENT DOCUMENTS

| | | | | |
|---|---|---|---|---|
| 9,067,589 B1* | 6/2015 | Zhao | ...................... | B60W 20/12 |
| 2019/0322267 A1* | 10/2019 | Kurihashi | ............. | B60W 20/12 |
| 2019/0322270 A1* | 10/2019 | Kurihashi | ............. | B60W 20/12 |
| 2019/0323848 A1* | 10/2019 | Kurihashi | .......... | G01C 21/3605 |
| 2020/0094812 A1* | 3/2020 | Kurihashi | ............. | B60W 10/08 |

FOREIGN PATENT DOCUMENTS

JP    2014-162261 A    9/2014

* cited by examiner

*Primary Examiner* — Michael A Berns
(74) *Attorney, Agent, or Firm* — Oliff PLC

(57) ABSTRACT

A control device of a hybrid vehicle 1, 1' comprises a driving plan generating part 61 configured to set in advance a driving mode and a target state of charge of the battery; and an output control part 62 configured to control outputs of the internal combustion engine and the motor. If the hybrid vehicle is being driven from a departure point through at least one via point to a final destination, the driving plan generating part is configured to divide a plurality of routes into pluralities of sections, and set a driving mode of all sections of at least one route to an EV mode. If a value of the target state of charge minus an actual state of charge of the battery becomes larger than a threshold value, the output control part is configured to change the driving mode in a section of a non-EV route.

13 Claims, 25 Drawing Sheets

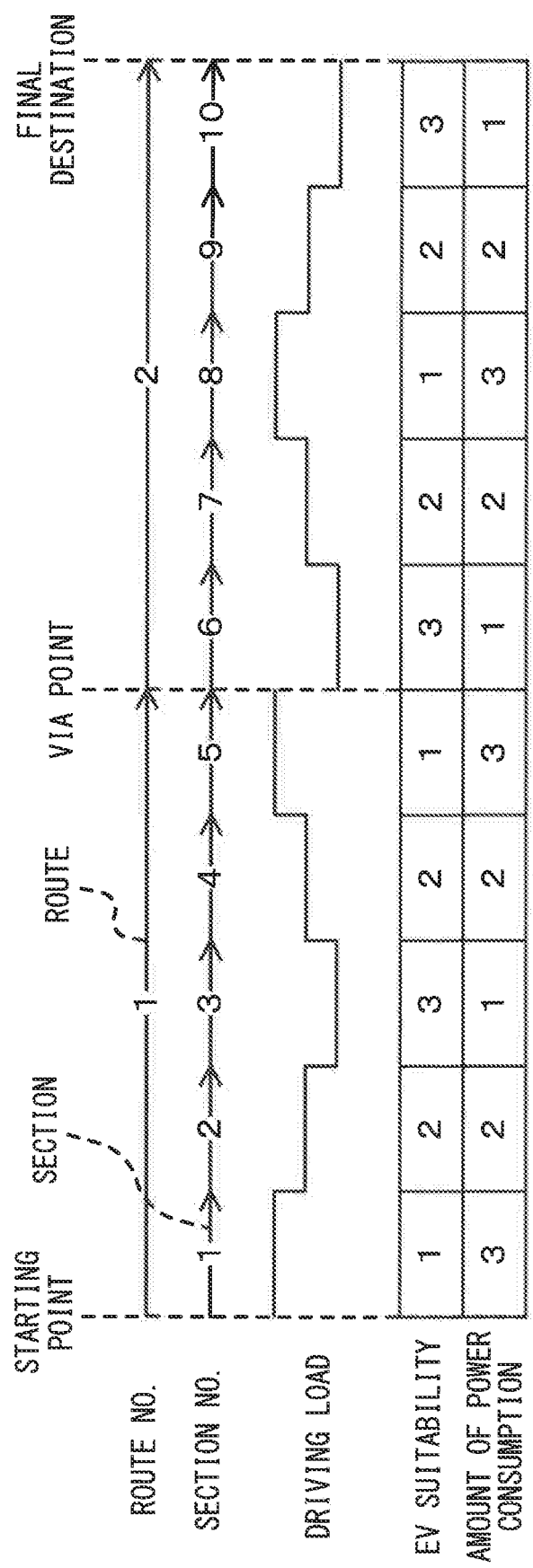

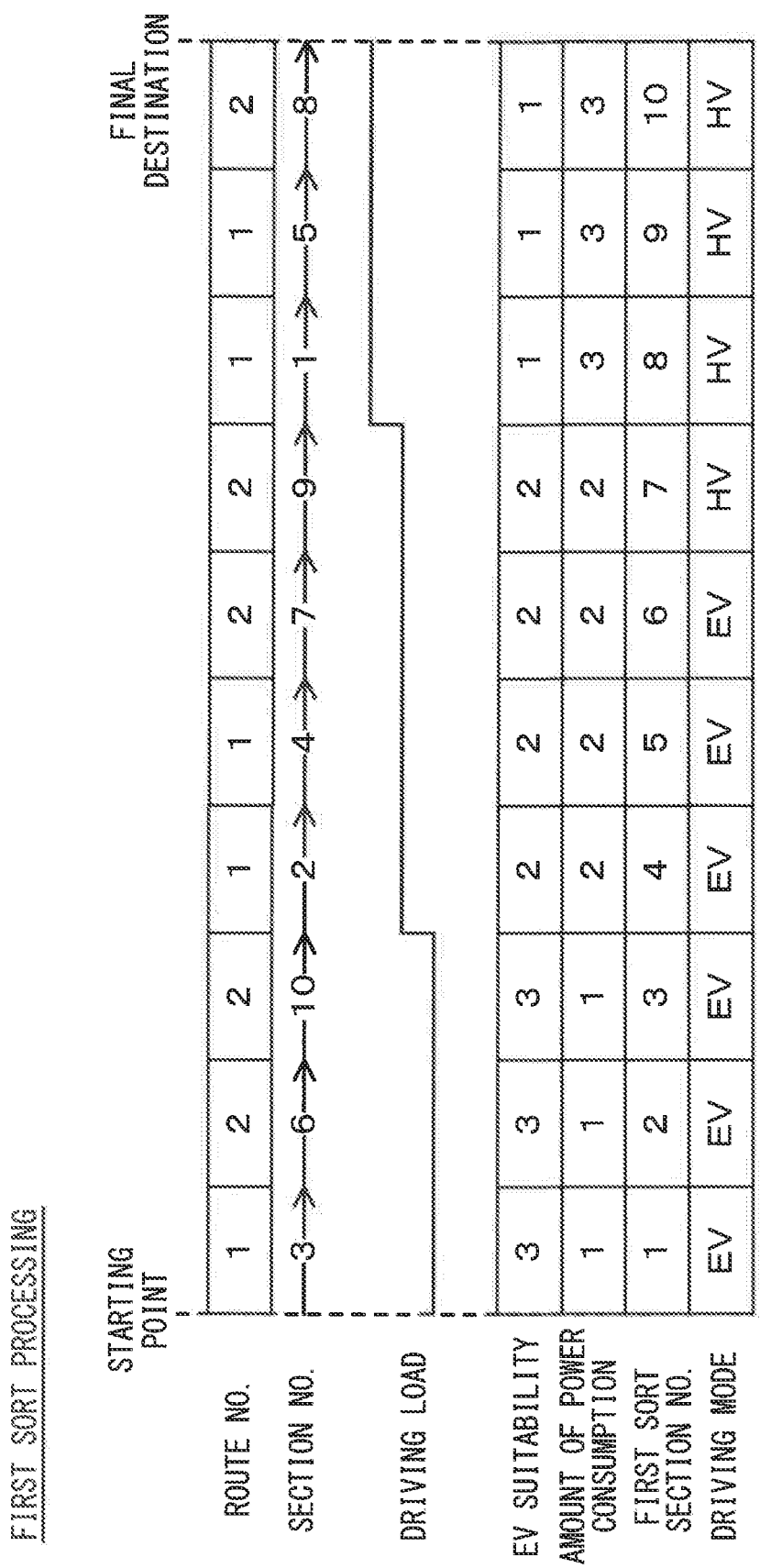

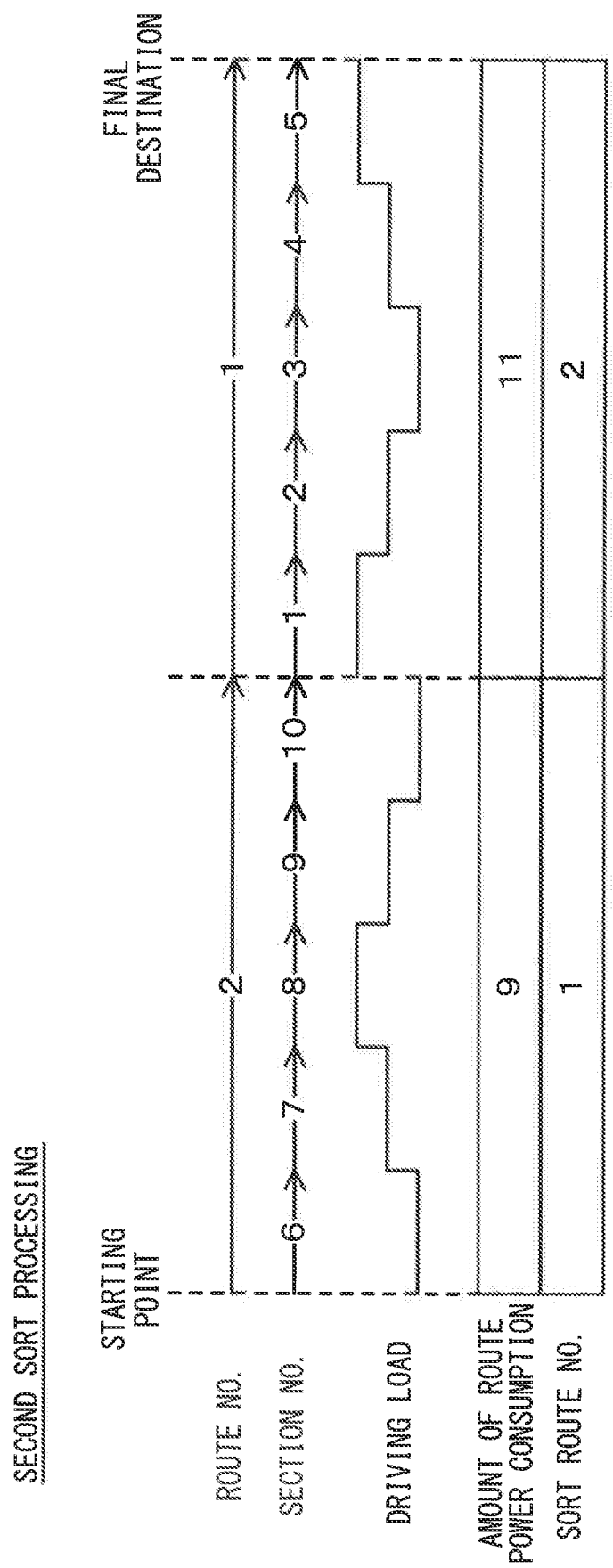

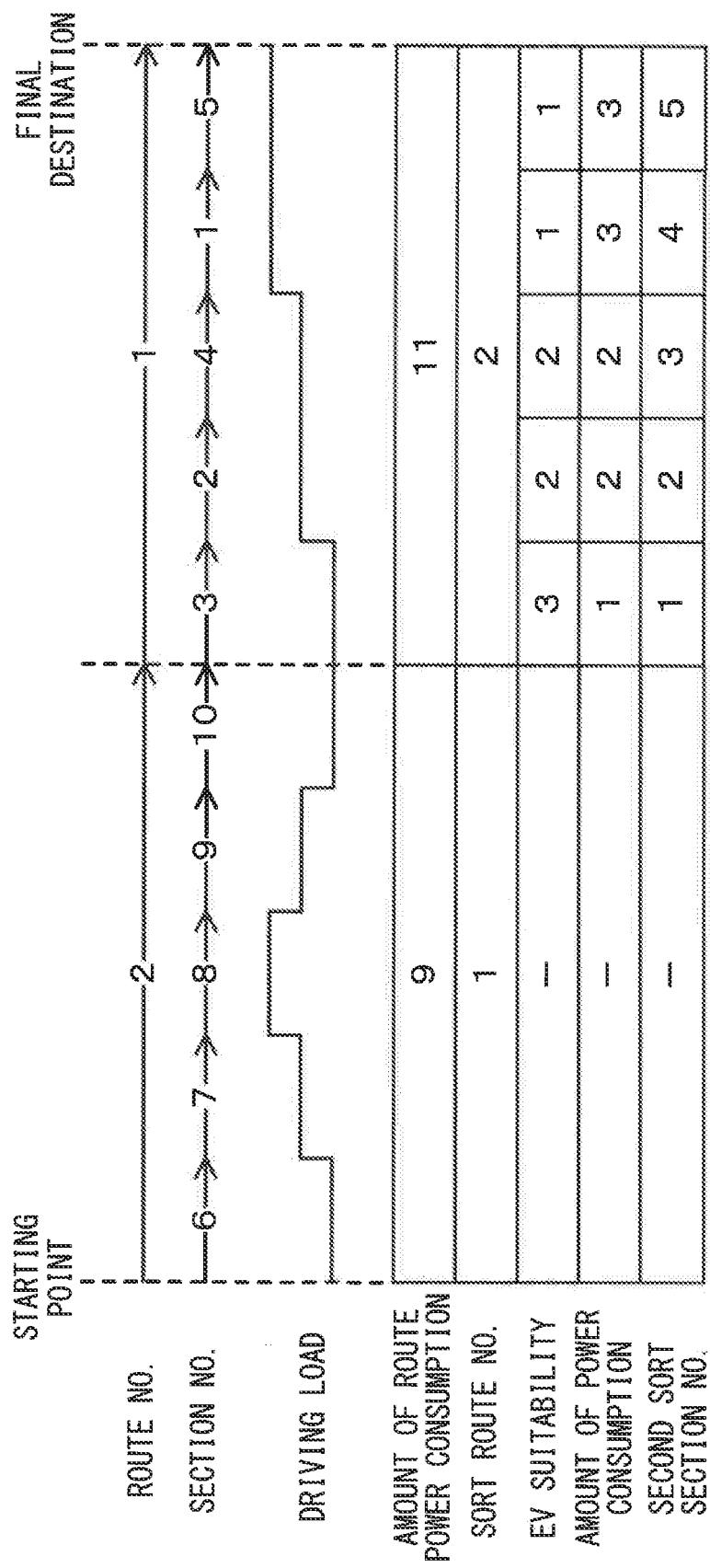

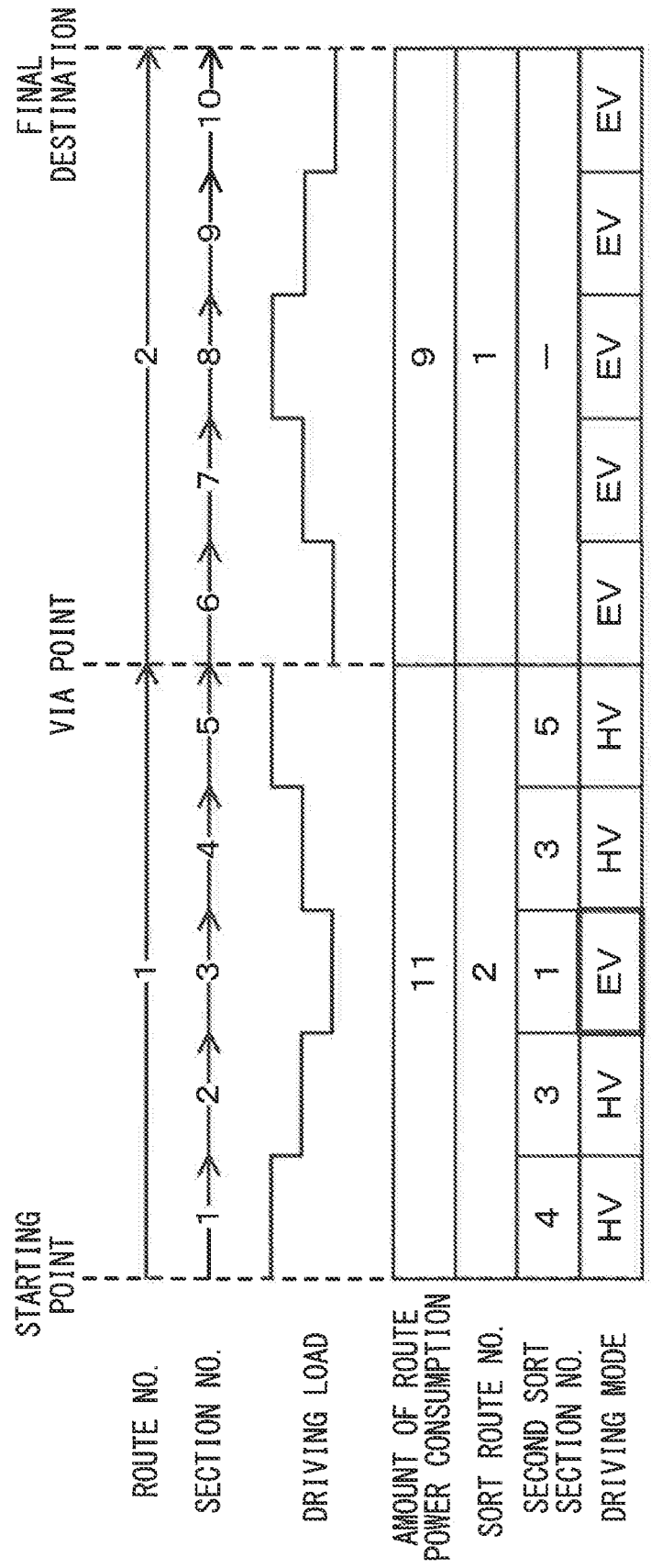

FIG. 6

| | | ROUTE NO. 1 | | | 2 | | | | 3 | | |
|---|---|---|---|---|---|---|---|---|---|---|---|
| | SECTION NO. | 1 | 2 | 3 | 4 | 5 | 6 | 7 | 8 | 9 | 10 |
| | AMOUNT OF POWER CONSUMPTION | 2 | 1 | 1 | 1 | 3 | 2 | 2 | 2 | 2 | 1 |
| | AMOUNT OF ROUTE POWER CONSUMPTION | 4 | | | 8 | | | | 5 | | |
| | EV ALLOCATION ORDER | 1 | 2 | 3 | 7 | 10 | 8 | 9 | 4 | 5 | 6 |
| DRIVING PLAN | DRIVING MODE | EV | EV | EV | EV | HV | HV | HV | EV | EV | EV |
| | TARGET SOC | 8 | 7 | 6 | 5 | 5 | 5 | 5 | 3 | 1 | 0 |
| | AMOUNT OF DRIVING FUEL CONSUMPTION | 0 | 0 | 0 | 0 | 3 | 2.5 | 2.5 | 0 | 0 | 0 |
| | AMOUNT OF WARM-UP FUEL CONSUMPTION | 0 | 0 | 0 | 0 | 2 | 0 | 0 | 0 | 0 | 0 |
| | AMOUNT OF CUMULATIVE FUEL CONSUMPTION | 0 | 0 | 0 | 0 | 5 | 7.5 | 10 | 10 | 10 | 10 |
| COMPARATIVE EXAMPLE1 | DRIVING MODE | EV | HV | EV | EV | HV | HV | HV | EV | EV | EV |
| | ACTUAL SOC | 7 | 7 | 6 | 5 | 5 | 5 | 5 | 3 | 1 | 0 |
| | AMOUNT OF DRIVING FUEL CONSUMPTION | 0 | 2 | 0 | 0 | 3 | 2.5 | 2.5 | 0 | 0 | 0 |
| | AMOUNT OF WARM-UP FUEL CONSUMPTION | 0 | 2 | 0 | 0 | 2 | 0 | 0 | 0 | 0 | 0 |
| | AMOUNT OF CUMULATIVE FUEL CONSUMPTION | 0 | 4 | 4 | 4 | 9 | 11.5 | 14 | 14 | 14 | 14 |
| COMPARATIVE EXAMPLE2 | DRIVING MODE | EV | EV | EV | EV | HV | HV | HV | EV | EV | HV |
| | ACTUAL SOC | 7 | 6 | 5 | 4 | 4 | 4 | 4 | 2 | 0 | 0 |
| | AMOUNT OF DRIVING FUEL CONSUMPTION | 0 | 0 | 0 | 0 | 3 | 2.5 | 2.5 | 0 | 0 | 2 |
| | AMOUNT OF WARM-UP FUEL CONSUMPTION | 0 | 0 | 0 | 0 | 2 | 0 | 0 | 0 | 0 | 2 |
| | AMOUNT OF CUMULATIVE FUEL CONSUMPTION | 0 | 0 | 0 | 0 | 5 | 7.5 | 10 | 10 | 10 | 14 |
| FIRST EMBODIMENT | DRIVING MODE | EV | EV | EV | HV | HV | HV | HV | EV | EV | EV |
| | ACTUAL SOC | 7 | 6 | 5 | 5 | 5 | 5 | 5 | 3 | 1 | 0 |
| | AMOUNT OF DRIVING FUEL CONSUMPTION | 0 | 0 | 0 | 2 | 3 | 2.5 | 2.5 | 0 | 0 | 0 |
| | AMOUNT OF WARM-UP FUEL CONSUMPTION | 0 | 0 | 0 | 2 | 0 | 0 | 0 | 0 | 0 | 0 |
| | AMOUNT OF CUMULATIVE FUEL CONSUMPTION | 0 | 0 | 0 | 4 | 7 | 9.5 | 12 | 12 | 12 | 12 |

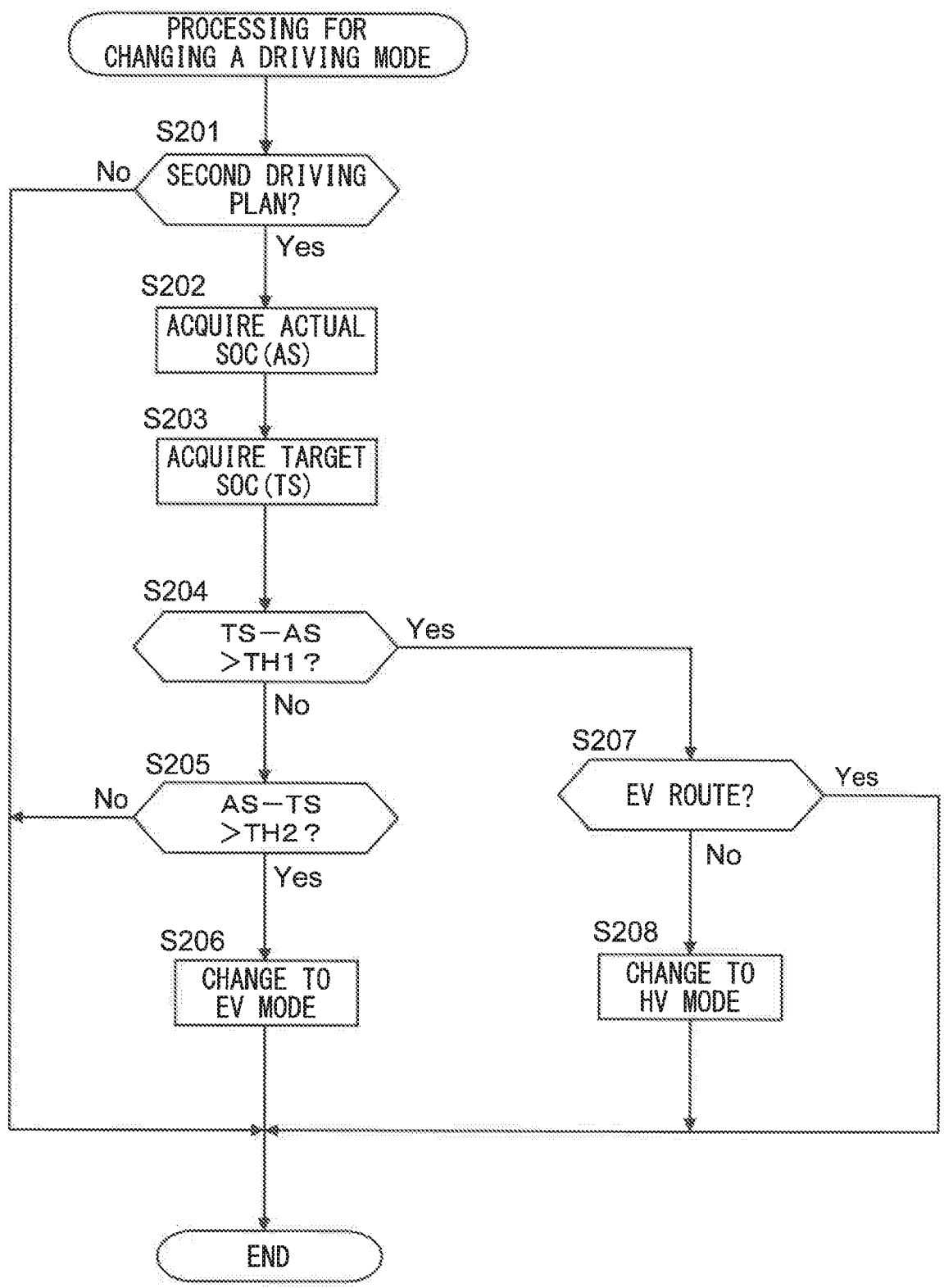

FIG. 9

| | | ROUTE NO. | 1 | | | 2 | | | | 3 | | |
|---|---|---|---|---|---|---|---|---|---|---|---|---|
| | | DRIVING LOAD | | | | | | | | | | |
| | | SECTION NO. | 1 | 2 | 3 | 4 | 5 | 6 | 7 | 8 | 9 | 10 |
| | | AMOUNT OF POWER CONSUMPTION | 2 | 1 | 1 | 1 | 3 | 2 | 2 | 1 | 2 | 2 |
| | | AMOUNT OF ROUTE POWER CONSUMPTION | 4 | | | 8 | | | | 5 | | |
| | | EV ALLOCATION ORDER | 1 | 2 | 3 | 7 | 10 | 8 | 9 | 4 | 5 | 6 |
| DRIVING PLAN | | DRIVING MODE | EV | EV | EV | EV | HV | HV | HV | EV | EV | EV |
| | | TARGET SOC | 8 | 7 | 6 | 5 | 5 | 5 | 5 | 4 | 2 | 0 |
| | | AMOUNT OF DRIVING FUEL CONSUMPTION | 0 | 0 | 0 | 0 | 3 | 2.5 | 2.5 | 0 | 0 | 0 |
| | | AMOUNT OF WARM-UP FUEL CONSUMPTION | 0 | 0 | 0 | 0 | 2 | 0 | 0 | 0 | 0 | 0 |
| | | AMOUNT OF CUMULATIVE FUEL CONSUMPTION | 0 | 0 | 0 | 0 | 5 | 7.5 | 10 | 10 | 10 | 10 |
| COMPARATIVE EXAMPLE1 | | DRIVING MODE | EV | HV | EV | HV | HV | HV | HV | EV | EV | EV |
| | | ACTUAL SOC | 7 | 7 | 5 | 5 | 5 | 5 | 5 | 4 | 2 | 0 |
| | | AMOUNT OF DRIVING FUEL CONSUMPTION | 0 | 2 | 0 | 2 | 3 | 2.5 | 2.5 | 0 | 0 | 0 |
| | | AMOUNT OF WARM-UP FUEL CONSUMPTION | 0 | 2 | 0 | 2 | 0 | 0 | 0 | 0 | 0 | 0 |
| | | AMOUNT OF CUMULATIVE FUEL CONSUMPTION | 0 | 4 | 4 | 8 | 11 | 13.5 | 16 | 16 | 16 | 16 |
| SECOND EMBODIMENT | | DRIVING MODE | EV | EV | EV | RE | RE | RE | HV | EV | EV | EV |
| | | ACTUAL SOC | 7 | 6 | 4 | 4.67 | 4.67 | 5 | 5 | 4 | 2 | 0 |
| | | AMOUNT OF DRIVING FUEL CONSUMPTION | 0 | 0 | 0 | 3 | 3 | 3 | 2.5 | 0 | 0 | 0 |
| | | AMOUNT OF WARM-UP FUEL CONSUMPTION | 0 | 0 | 0 | 2 | 0 | 0 | 0 | 0 | 0 | 0 |
| | | AMOUNT OF CUMULATIVE FUEL CONSUMPTION | 0 | 0 | 0 | 5 | 8 | 11 | 13.5 | 13.5 | 13.5 | 13.5 |

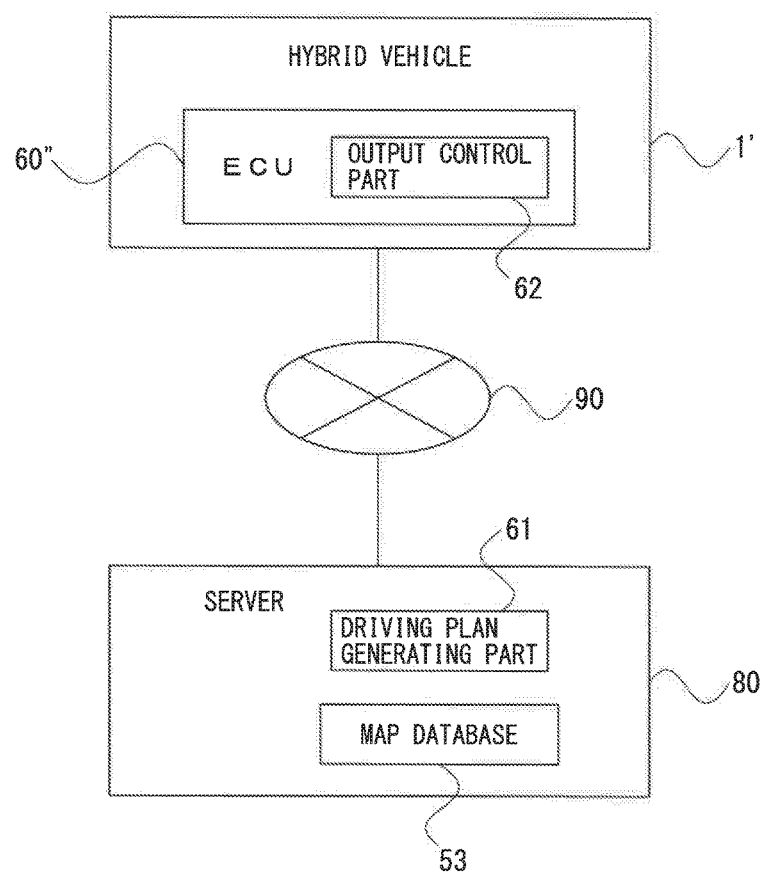

CONTROL DEVICE OF HYBRID VEHICLE

FIELD

The present invention relates to a control device of a hybrid vehicle.

BACKGROUND

Known in the past has been a hybrid vehicle provided with an internal combustion engine, a motor, and a battery supplying electric power to the motor and able to be charged by output of the internal combustion engine. In such a hybrid vehicle, an EV mode in which drive use power is output by only the motor can be selected as the driving mode.

In the EV mode, the internal combustion engine is stopped, so by setting the driving mode to the EV mode, it is possible to improve the fuel efficiency of the hybrid vehicle. In the hybrid vehicle described in PTL 1, a route until the destination is divided in a plurality of sections and the driving modes in sections with a high EV suitability are preferentially set to the EV mode.

CITATIONS LIST

Patent Literature

[PTL 1] Japanese Unexamined Patent Publication No. 2014-162261A

SUMMARY

Technical Problem

In this regard, if the hybrid vehicle is driven from a departure point through a via point to a final destination, often the temperature of the internal combustion engine will fall while the vehicle is stopped at the via point. If the temperature of the internal combustion engine falls, a catalyst has to be warmed up at the time of restart of the internal combustion engine and fuel is excessively consumed for warming up the catalyst.

For this reason, even if the ratio by which the EV mode is selected as the driving mode is made higher, if the number of times of warm-up of the catalyst is high, sometimes the fuel efficiency deteriorates. However, in the hybrid vehicle described in PTL 1, the fuel consumed for warming up the catalyst is not considered at all when selecting of the driving modes at the sections.

Therefore, in consideration of the above problem, an object of the present invention is to reduce the number of times of warm-up of a catalyst provided in an exhaust passage of an internal combustion engine when a hybrid vehicle is being driven from a departure point through a via point to a final destination.

Solution to Problem

The summary of the present disclosure is as follows.

(1) A control device of a hybrid vehicle for controlling a hybrid vehicle comprising an internal combustion engine in which a catalyst is provided in an exhaust passage, a motor, and a battery supplying electric power to the motor and able to be charged by output of the internal combustion engine, the control device of a hybrid vehicle comprising: a driving plan generating part configured to set in advance a driving mode and a target state of charge of the battery when the hybrid vehicle is being driven; and an output control part configured to control outputs of the internal combustion engine and the motor based on the driving mode, wherein if the hybrid vehicle is being driven from a departure point through at least one via point to a final destination, the driving plan generating part is configured to divide a plurality of routes each having the via point as at least one of a starting point and an end point into pluralities of sections, and set a driving mode of all sections of at least one route to an EV mode in which the internal combustion engine is stopped and drive use power is output by only the motor, and if a value of the target state of charge minus an actual state of charge of the battery becomes larger than a threshold value, the output control part is configured to change the driving mode set by the driving plan generating part so that the actual state of charge approaches the target state of charge in a section of a non-EV route other than an EV route in which driving modes of all sections are set to the EV.

(2) The control device of a hybrid vehicle described in above (1), wherein if the value of the target state of charge minus the actual state of charge becomes larger than the threshold value, the output control part is configured to change the driving mode set by the driving plan generating part so that the actual state of charge is maintained in a section of the non-EV route.

(3) The control device of a hybrid vehicle described in above (1), wherein if the value of the target state of charge minus the actual state of charge becomes larger than the threshold value, the output control part is configured to change the driving mode set by the driving plan generating part so that the actual state of charge becomes higher in a section of the non-EV route.

(4) The control device of a hybrid vehicle described in above (1), wherein the output control part is configured to change the driving mode set by the driving plan generating part so that the actual state of charge becomes higher in a section of the non-EV route if a value of the target state of charge at an end point of the non-EV route minus the actual state of charge is larger than a predetermined value, and change the driving mode set by the driving plan generating part so that the actual state of charge is maintained in a section of the non-EV route if the value of the target state of charge at the end point of the non-EV route minus the actual state of charge is equal to or less than the predetermined value.

(5) The control device of a hybrid vehicle described in any one of above (1) to (4), further comprising a lower limit value setting part configured to set a lower limit value of a state of charge of the battery, wherein the output control part is configured to change a driving mode set by the driving plan generating part so that an actual state of charge of the battery is maintained or becomes higher if the actual state of charge reaches the lower limit value, and the lower limit value setting part is configured to lower the lower limit value at the EV route compared with the non-EV route.

(6) The control device of a hybrid vehicle described in above (5), wherein the lower limit value setting part is configured to lower the lower limit value at the EV route only if the actual state of charge does not reach a reference value when the driving mode is maintained at the EV mode at the EV route, and the reference value is lower than the lower limit value at the non-EV route.

Advantageous Effects of Invention

According to the present invention, it is possible to reduce the number of times of warm-up of a catalyst provided in an exhaust passage of an internal combustion engine when a hybrid vehicle is being driven from a departure point through a via point to a final destination.

BRIEF DESCRIPTION OF DRAWINGS

FIG. 4A is a view for explaining the generation of a first driving plan.

FIG. 4B is a view for explaining the generation of the first driving plan.

FIG. 5B is a view for explaining the generation of the second driving plan.

FIG. 5C is a view for explaining the generation of the second driving plan.

FIG. 5G is a view for explaining the generation of the second driving plan.

FIG. 6 is a view showing a specific example of control in the first embodiment of the present invention together with a comparative example.

FIG. 8 is a flow chart showing a control routine of processing for changing a driving mode in the first embodiment of the present invention.

FIG. 9 is a view showing a specific example of control in a second embodiment of the present invention together with a comparative example.

FIG. 15 is a block diagram schematically showing the configuration of a control device of a hybrid vehicle etc., according to a fifth embodiment of the present invention.

DESCRIPTION OF EMBODIMENTS

Figure 1:
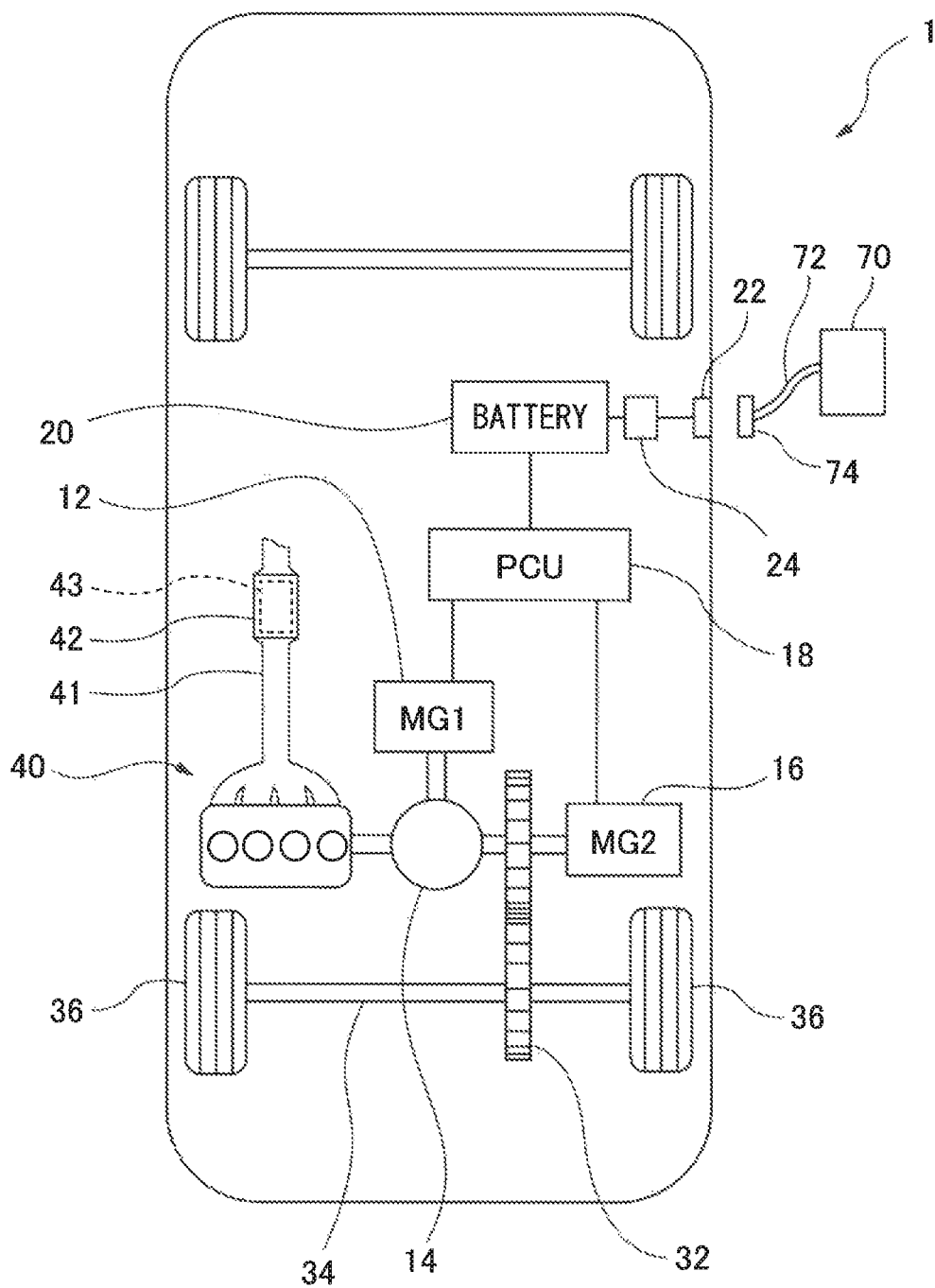
FIG. 1 is a view schematically showing the configuration of a hybrid vehicle according to a first embodiment of the present invention.

Below, referring to the drawings, embodiments of the present invention will be explained in detail. Note that, in the following explanation, similar components are assigned the same reference signs.

First Embodiment

Below, referring to FIG. 1 to FIG. 8, a first embodiment of the present invention will be explained.

<Configuration of Hybrid Vehicle>

FIG. 1 is a view schematically showing the configuration of a hybrid vehicle 1 according to the first embodiment of the present invention. A hybrid vehicle (below, simply referred to as the "vehicle") 1 is provided with an internal combustion engine 40, first motor-generator 12, power distributing mechanism 14, second motor-generator 16, power control unit (PCU) 18, and battery 20.

The internal combustion engine 40 makes a mixture of fuel and air burn in a cylinder to output drive power. The internal combustion engine 40 is, for example, a gasoline engine or diesel engine. In the exhaust passage 41 of the internal combustion engine 40, a catalyst 43 housed in a casing 42 is provided. The catalyst 43 is, for example, a three-way catalyst, $NO_X$ storage and reduction catalyst, selective reduction type $NO_X$ reducing catalyst (SCR catalyst), etc. The output shaft (crankshaft) of the internal combustion engine 40 is mechanically connected to a power dividing mechanism 14. The output of the internal combustion engine 40 is input to the power dividing mechanism 14.

The first motor-generator 12 functions as a generator and motor. The first motor-generator 12 is mechanically connected to the power distributing mechanism 14, and the output of the first motor-generator 12 is input to the power distributing mechanism 14. Further, the first motor-generator 12 is electrically connected to the PCU 18. When the first motor-generator 12 functions as a generator, the electric power generated by the first motor-generator 12 is supplied through the PCU 18 to at least one of the second motor-generator 16 and battery 20. On the other hand, when the first motor-generator 12 functions as a motor, the electric power stored in the battery 20 is supplied through the PCU 18 to the first motor-generator 12.

The power distributing mechanism 14 is configured as a known planetary gear mechanism including a, sun gear, ring gear, pinion gears, and a planetary carrier. The output shaft of the internal combustion engine 40 is coupled with the planetary carrier, the first motor-generator 12 is coupled with the sun gear, and a speed reducer 32 is coupled with the ring gear. The power distributing mechanism 14 distributes the output of the internal combustion engine 40 to the first motor-generator 12 and the speed reducer 32.

Specifically, when the first motor-generator 12 functions as a generator, the output of the internal combustion engine 40 input to the planetary carrier is distributed to the sun gear coupled with the first motor-generator 12 and the ring gear coupled with the speed reducer 32 in accordance with the gear ratio. The output of the internal combustion engine 40 distributed to the first motor-generator 12 is used to generate electric power by the first motor-generator 12. On the other hand, the output of the internal combustion engine 40 distributed to the speed reducer 32 is transmitted as power for driving use through an axle 34 to the wheels 36. Therefore, the internal combustion engine 40 can output power for driving use. Further, when the first motor-generator 12 functions as a motor, the output of the first motor-generator 12 is supplied through the sun gear and planetary carrier to the output shaft of the internal combustion engine 40 whereby the internal combustion engine 40 is cranked.

The second motor-generator 16 functions as a generator and motor. The second motor-generator 16 is mechanically connected to the speed reducer 32, and the output of the second motor-generator 16 is supplied to the speed reducer 32. The output of the second motor-generator 16 supplied to the speed reducer 32 is transmitted as power for driving use to the wheels 36 through the axle 34. Therefore, the second motor-generator 16 can output power for driving use.

Further, the second motor-generator 16 is electrically connected to the PCU 18. At the time of deceleration of the vehicle 1, due to rotation of the wheels 36, the second motor-generator 16 is driven and the second motor-generator 16 functions as a generator. As a result, so-called regeneration is performed. When the second motor-generator 16 functions as a generator, the regenerative power generated by the second motor-generator 16 is supplied through the PCU 18 to the battery 20. On the other hand, when the second motor-generator 16 functions as a motor, the power stored in the battery 20 is supplied through the PCU 18 to the second motor-generator 16.

The PCU 18 is electrically connected to the first motor-generator 12, second motor-generator 16, and battery 20. The PCU 18 includes an inverter, a booster converter, and a DC-DC converter. The inverter converts DC power supplied from the battery 20 to AC power and converts AC power generated by the first motor-generator 12 or second motor-generator 16 to DC power. The booster converter boosts the voltage of the battery 20 in accordance with need when the power stored in the battery 20 is supplied to the first motor-generator 12 or the second motor-generator 16. The DC-DC converter lowers the voltage of the battery 20 when the electric power stored in the battery 20 is supplied to the headlights or other electronic equipment.

The battery 20 is supplied with the electric power generated by the first motor-generator 12 using the output of the internal combustion engine 40 and the regenerative electric power generated by the second motor-generator 16 using the regenerative energy. Therefore, the battery 20 can be charged by the output of the internal combustion engine 40 and the regenerative energy. The battery 20 is for example a lithium ion battery, nickel hydrogen battery, or other secondary battery.

The vehicle 1 is further provided with a charging port 22 and charger 24. The battery 20 can be charged by an external power source 70 as well. Therefore, the vehicle 1 is a so-called "plug-in hybrid vehicle".

The charging port 22 is configured so as to receive the electric power from the external power source 70 through a charging connector 74 of a charging cable 72. When the battery 20 is charged by the external power source 70, the charging connector 74 is connected to the charging port 22. The charger 24 converts the electric power supplied from the external power source 70 to electric power which can be supplied to the battery 20. Note that, the charging port 22 may also be connected to the PCU 18, and the PCU 18 may also function as the charger 24.

<Control Device of Hybrid Vehicle>

Figure 2:
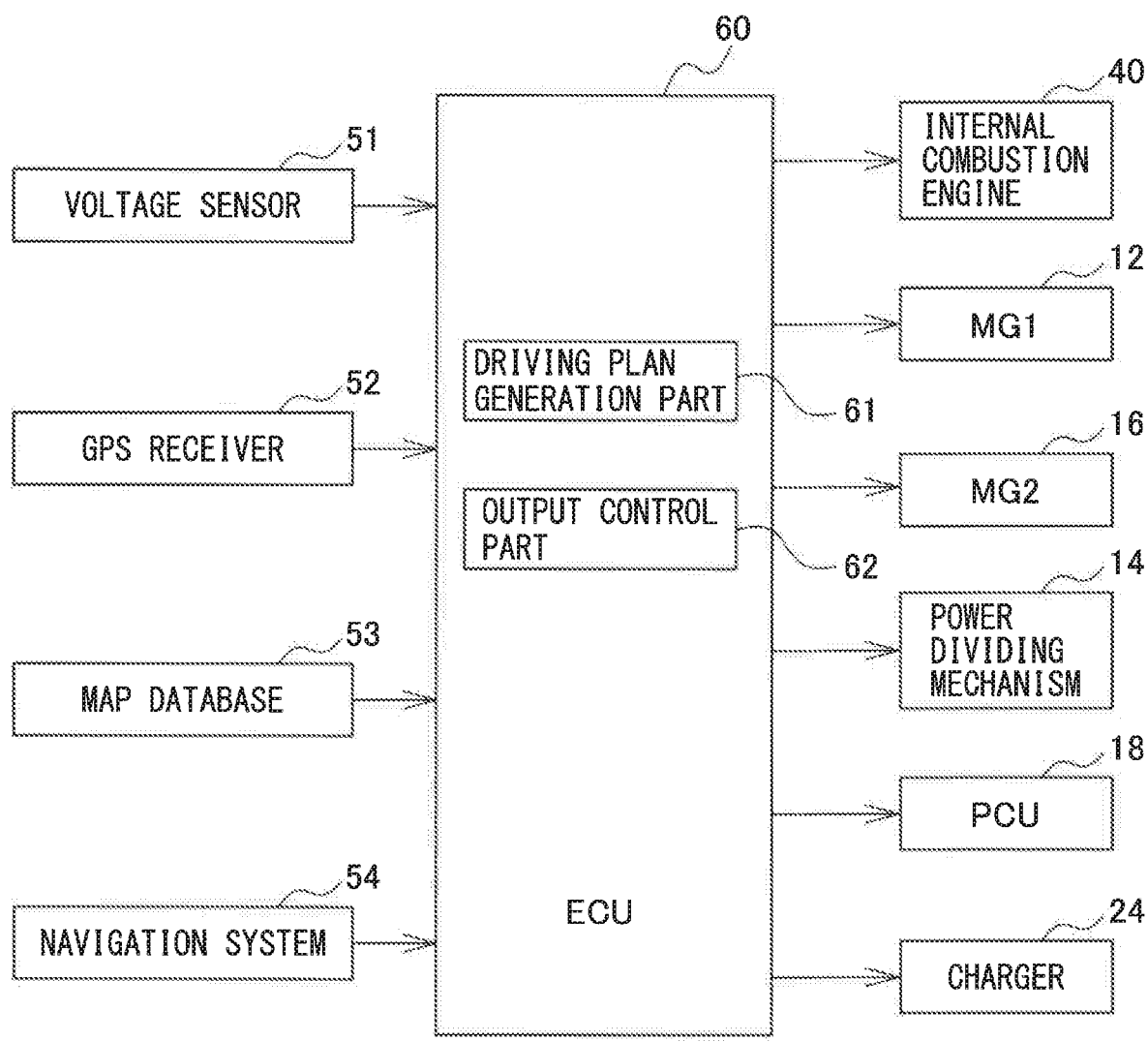
FIG. 2 is a block diagram schematically showing the configuration of a control device of a hybrid vehicle etc., according to the first embodiment of the present invention.

FIG. 2 is a block diagram schematically showing the configuration of a control device etc., of a hybrid vehicle according to a first embodiment of the present invention. The vehicle 1 is provided with an electronic control unit (ECU) 60. The ECU 60 is an electronic control device controlling the vehicle 1. The ECU 60 is provided with a read only memory (ROM) and random access memory (RAM) or other such memory, a central processing unit (CPU), input port, output port, communication module, etc. In the present embodiment, a single ECU 60 is provided, but a plurality of ECUs may be provided for the different functions.

The outputs of various sensors provided at the vehicle 1 are input to the ECU 60. For example, in the present embodiment, the outputs of a voltage sensor 51 and a GPS receiver 52 are input to the ECU 60.

The voltage sensor 51 is provided at the battery 20 and detects the voltage across the electrodes of the battery 20. The voltage sensor 51 is connected to the ECU 60, so the output of the voltage sensor 51 is transmitted to the ECU 60. The ECU 60 calculates the state of charge (SOC: State Of Charge) of the battery 20 based on the output of the voltage sensor 51, etc.

The GPS receiver 52 receives signals from three or more GPS satellites and detects the current position of the vehicle 1 (for example, the longitude and latitude of the vehicle 1). The GPS receiver 52 is connected to the ECU 60, so the output of the GPS receiver 52 is transmitted to the ECU 60.

Further, the ECU 60 is connected to a map database 53 provided at the vehicle 1. The map database 53 is a database relating to the map information. The map information includes road information such as positional information of roads, shape information of roads (for example curved or straight, the radius of curvature of curves, the road gradients, etc.), the types of roads, the speed limits, and other information. The ECU 60 acquires map information from the map database 53.

Further, the ECU 60 is connected to a navigation system 54 provided at the vehicle 1. The navigation system 54 sets the driving route of the vehicle 1 up to the destination based on the current position of the vehicle 1 detected by the GPS receiver 52, the map information of the map database 53, input by the driver, etc. The driving route set by the navigation system 54 is transmitted to the ECU 60. Note that, the GPS receiver 52 and map database 53 may be built into the navigation system 54.

The ECU 60 is connected to the internal combustion engine 40, first motor-generator 12, second motor-generator 16, power dividing mechanism 14, PCU 18, and charger 24, and controls the same. In the present embodiment, the ECU 60 runs programs etc., stored in the memory to thereby function as a driving plan generating part 61 and an output control part 62. Therefore, the control device of the vehicle 1 is provided with the driving plan generating part 61 and output control part 62.

The driving plan generating part 61 sets in advance a driving mode and a target SOC of the battery 20 when the vehicle 1 is being driven. The output control part 62 controls the outputs of the internal combustion engine 40 and second motor-generator 16 based on the driving mode. The driving plan generating part 61 selects the EV (electric vehicle) mode or HV (hybrid vehicle) mode as the driving mode.

In the EV mode, the internal combustion engine 40 is stopped and drive use power is output by only the second motor-generator 16. For this reason, in the EV mode, electric power is supplied from the battery 20 to the second motor-generator 16. As a result, in the EV mode, the amount of electric power of the battery 20 decreases and the SOC of the battery 20 falls. Note that, a one-way clutch transmitting rotational force in only one direction is provided at the power dividing mechanism 14, In the EV mode, drive use power may be output by the first motor-generator 12 and the second motor-generator 16.

On the other hand, in the HV mode, drive use power is output by the internal combustion engine 40 and the second motor-generator 16. In the HV mode, basically, the electric power generated by the first motor-generator 12 using the output of the internal combustion engine 40 is supplied to the second motor-generator 16 and the supply of electric power from the battery 20 is stopped, Note that, in the HV mode, the battery 20 may temporarily be charged by the output of the internal combustion engine 40 or electric power may temporarily be supplied from the battery 20 to the second motor-generator 16. In the HIV mode, the amount of electric power and SOC of the battery 20 are maintained substantially constant, Therefore, the degree of drop of the SOC in the EV mode is larger than the degree of drop of the SOC in the V mode.

In the HIV mode, fuel is consumed in the internal combustion engine 40. In the EV mode, fuel is not consumed in the internal combustion engine 40. For this reason, in order to improve the fuel efficiency of the vehicle 1, it is desirable to maintain the driving mode at the EV mode as much as possible. However, if the SOC of the battery 20 is low, it is not possible to set the driving mode to the EV mode. For this reason, if driving the vehicle 1 for a long period of time without charging the battery 20 by the external power supply 70, it is necessary to jointly use the EV mode and HV mode as the driving mode.

The heat efficiency of the internal combustion engine 40 usually becomes lower when the engine load is low. For this reason, at a section with a low driving load, for example, a section with many traffic lights or a section in which congestion easily occurs, it is desirable to set the driving mode to the HV mode and make the internal combustion engine 40 stop. On the other hand, at a section with a high driving load, for example, a highway, ascending slope, etc., it is desirable to set the driving mode to the HV mode.

Further, charging of the battery 20 by the outside power supply 70 is not necessarily performed every one trip (time period from when ignition switch of vehicle 1 is turned on to when it is turned off). For this reason, sometimes several trips are required until the battery 20 is charged by the outside power supply 70 at the final destination (for example home). For example, if going back and forth between the home and workplace, the workplace becomes the via point and two trips are required. Further, if returning from the home to the home through two destinations (shopping center etc.), the destinations become via points and three trips are required.

If the vehicle 1 is driven from the departure point through a via point to the final destination, often the temperature of the internal combustion engine 40 will fall while stopped at the via point. If the temperature of the internal combustion engine 40 falls, the catalyst 43 has to be warmed up at the time of restart of the internal combustion engine 40 and fuel is excessively consumed for warming up the catalyst 43.

For this reason, even if the ratio by which the EV mode is selected as the driving mode is made higher, if the number of times of warm-up of the catalyst 43 is large, sometimes the fuel efficiency deteriorates. Therefore, in the present embodiment, the driving mode is set so that the fuel efficiency of the driving route as a whole is optimized considering also the fuel consumed for warming up the catalyst 43.

Specifically, if the vehicle 1 is driven from the departure point through at least one via point to the final destination, the driving plan generating part 61 divides a plurality of routes having a via point as at least one of the starting point and end point into pluralities of sections, and sets driving modes of all sections of at least one route to an EV mode. In the EV route in which the driving modes of all sections are set to the EV mode, the internal combustion engine 40 is not started up, so the catalyst 43 is not warmed up. For this reason, by setting the driving modes of all sections of at least one route to the EV mode, if the vehicle 1 is driven from the departure point through at least one via point to the final destination, the number of times of warm-up of the catalyst 43 can be reduced.

The driving plan generating part 61 sets the driving modes of the sections so that the SOC of the battery 20 reaches the lower limit value of the SOC of the battery 20 when the vehicle 1 reaches the final destination. Further, the driving plan generating part 61 calculates the amount of power consumption when the vehicle 1 is being driven by the EV mode over each of the routes and sets the driving modes of all sections of the route to the EV mode in order from the route with the smallest amount of power consumption up. By doing this, it is possible to raise the ratio of the EV route with respect to all routes of the driving routes and possible to more efficiently reduce the number of times of warm-up of the catalyst 43.

<Processing for Generating Driving Plan>

Figure 3A:
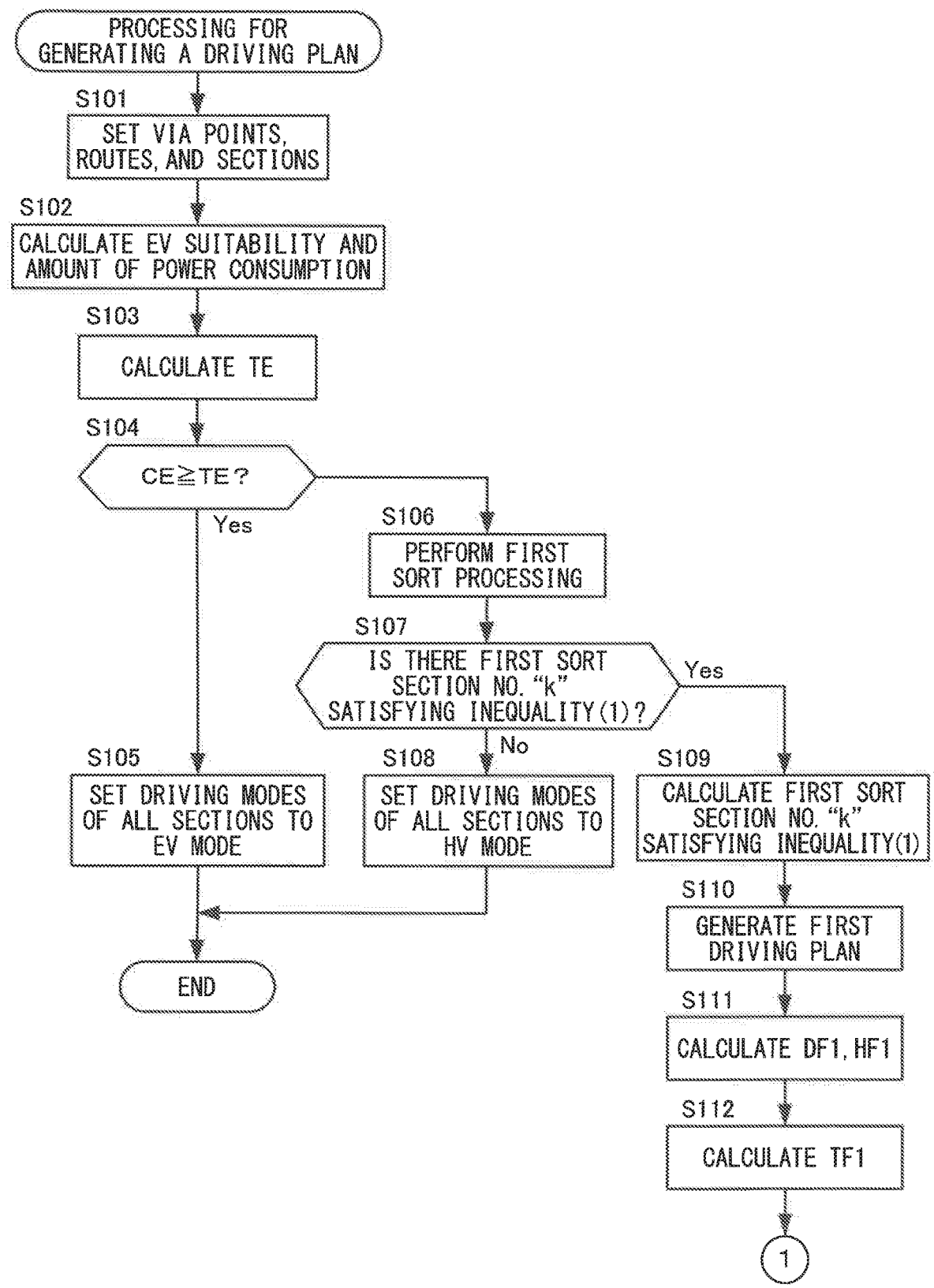
FIG. 3A is a flow chart showing a control routine of processing for generating a driving plan in the first embodiment of the present invention.
Figure 3B:
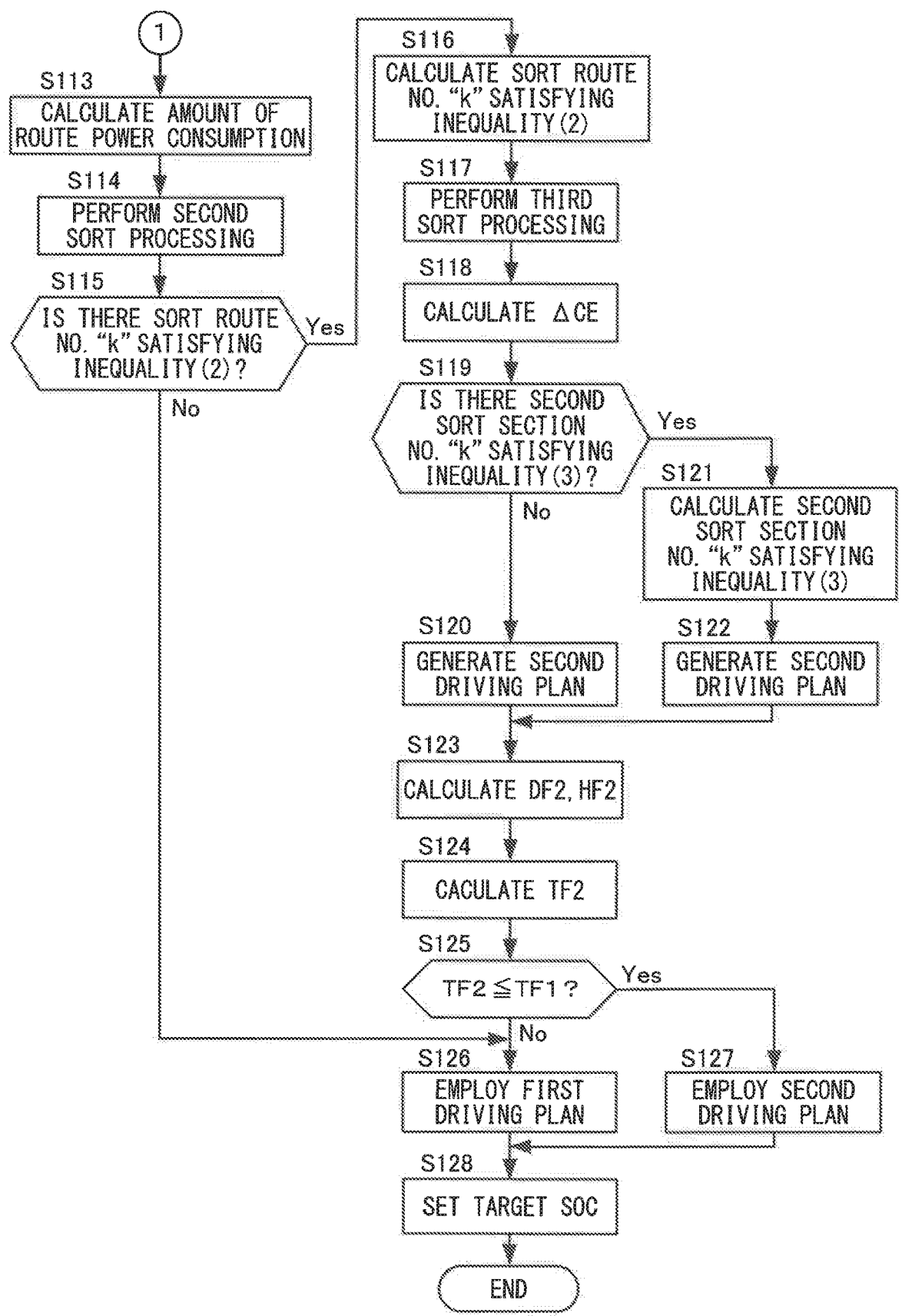
FIG. 3B is a flow chart showing a control routine of processing for generating a driving plan in the first embodiment of the present invention.
Figure 4C:
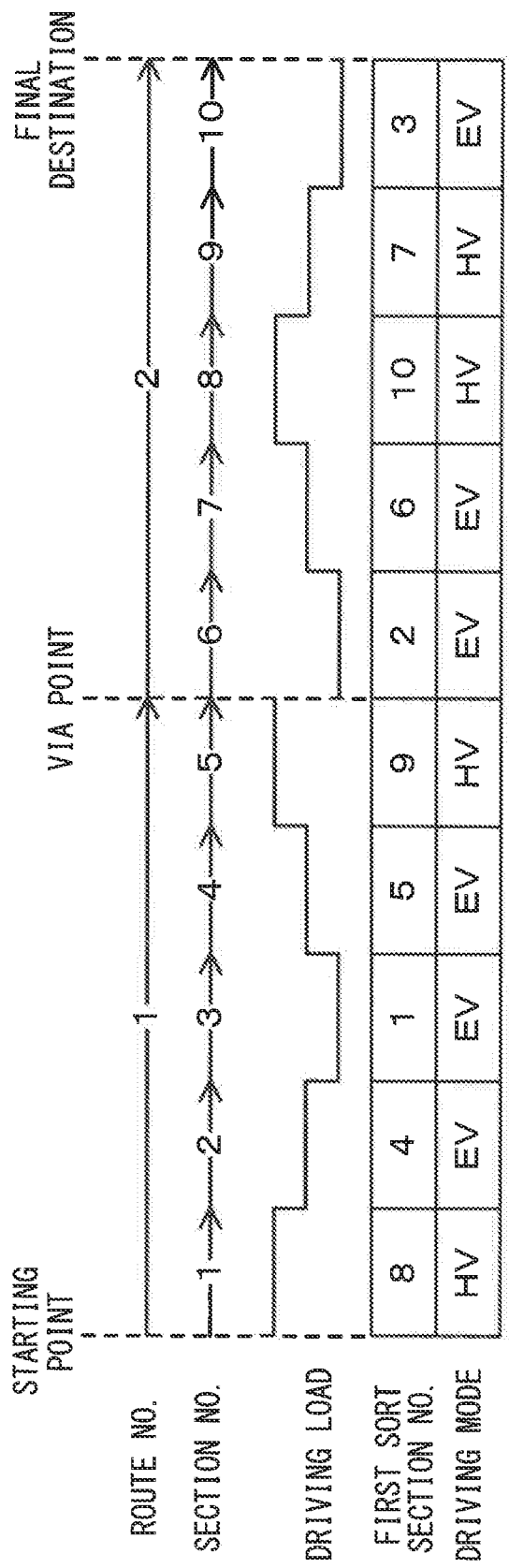
FIG. 4C is a view for explaining the generation of the first driving plan.

FIG. 3A and FIG. 3B are flow charts showing a control routine of processing for generating a driving plan in a first embodiment of the present invention. The present control routine is performed by the ECU 60. In the present control routine, a first driving plan not considering the number of times of warm-up of the catalyst 43 and a second driving plan considering the number of times of warm-up of the catalyst 43 are generated and the driving plan with a smaller total of the amounts of fuel consumption is employed. FIG. 4A to FIG. 4C are views for explaining the generation of the first driving plan. FIG. 5A to FIG. 5G are views for explaining the generation of the second driving plan.

At step S101 of FIG. 3A, the driving plan generating part 61, as shown in FIG. 4A, divides a driving route from a departure point to a final destination into a plurality of routes and divides the routes into a plurality of sections. A route has a via point as at least one of the starting point and end point. In the example of FIG. 4A, it is comprised of a first route from the departure point to a via point and a second route from the via point to the final destination. Further, the first route and second route are respectively divided into five sections. The sections are determined based on the distances, positions of cross points, road IDs contained in map information of the map database 53, etc.

The departure point and the final destination are, for example, set to a main storage location of the vehicle 1 such as the home. Note that, the departure point and the final destination do not necessarily have to be the same. For example, if there is a charging station with a high frequency of utilization, the home and charging station may be set as the departure point and the final destination or the home and charging station may be set as the final destination and departure point.

A via point is an end point of one trip. For example, it is set to a destination input by the driver to the navigation system 54 at the departure point. Further, if the vehicle 1 travels around a plurality of destinations set in advance, the destinations are set as via points. Further, if the vehicle 1 is used to commute to work, the workplace is set as a via point or if the vehicle 1 is used to commute to school, the school is set as a via point, Note that, the navigation system 54 may be configured so that the driver can input the departure point, the final destination, and the via points.

Next, at step S102, the driving plan generating part 61 calculates the driving load of each of the sections based on the road information of the sections (for example, road gradients, speed limits, types of roads, etc.). The road information of the sections is acquired from the map database 53. Note that, the driving plan generating part 61 may calculate the driving load of each of the sections based on the driving logs of the sections.

The driving plan generating part 61 calculates the EV suitabilities of the sections based on the driving loads of the sections. The EV suitability is an indicator showing the degree of suitability to the EV mode and is made higher the lower the driving load. In the present description, the EV suitability is expressed by a simplified numerical value. The EV suitability becomes higher the larger the numerical value.

Further, the driving plan generating part 61 calculates the amount of power consumption of the section based on the driving load and distance of the section. In the present description, the amount of power consumption is expressed by a simplified numerical value. The amount of power consumption becomes larger the larger the numerical value.

Next, at step S103, the driving plan generating part 61 calculates the amount of total power consumption TE when the vehicle 1 is being driven over an entire driving route by the EV mode based on the amounts of power consumption of the section. The amount of total power consumption TE is the total of the amounts of power consumption of the sections.

Next, at step S104, the driving plan generating part 61 calculates the amount of electric power CE of the battery 20 able to be used in the EV mode and judges whether the amount of electric power CE is equal to or more than the amount of total power consumption TE. The driving plan generating part 61 calculates the amount of electric power CE based on the SOC of the battery 20. The higher the SOC of the battery 20, the larger the amount of electric power CE.

If at step S104 it is judged that the amount of electric power CE is equal to or more than the amount of total power consumption TE, the control routine proceeds to step S105. At step S105, the driving plan generating part 61 sets the driving modes of all of the sections to the EV mode. That is, the entire route is set to an EV route. After step S105, the present control routine ends.

On the other hand, if at step S104 it is judged that the amount of electric power CE is less than the amount of total power consumption TE, the control routine proceeds to step S106. At step S106, the driving plan generating part 61, as shown in FIG. 4B, performs the first sort processing to rearrange the order of the sections.

In the first sort processing, the order of the sections is rearranged based on the EV suitability, the amount of power consumption, and the section no. Specifically, the sections are rearranged in the order of the highest EV suitability down. Further, if the EV suitability is equal, the sections are rearranged in the order of the smallest amount of power consumption up. Further, if the EV suitability and the amount of power consumption are equal, the sections are rearranged in the order of the smallest section no. up. Furthermore, the driving plan generating part 61 assigns a first sort section no. to each section in the rearranged order (i=1, . . . , n; in the example shown in FIG. 4B, n=10).

Next, at step S107, the driving plan generating part 61 judges whether there is a first sort section no. "k" satisfying the following inequality (I):

$$DE_k \leq CE < DE_{k+1} \qquad (1)$$

Here, $DE_k$ is the total of the amounts of power consumption of the sections from the first sort section no. 1 to the first sort section no. "k". $DE_{k+1}$ is the total of the amounts of power consumption of the sections from the first sort section no. 1 to the first sort section no. k+1.

Specifically, the driving plan generating part 61 judges that there is no sort section no. "k" satisfying the inequality (1) if the amount of power consumption $DE_1$ of the section when the first sort section no. "k" is 1 is larger than the amount of electric power CE calculated at step S104. On the other hand, the driving plan generating part 61 judges that there is a first sort section no, "k" satisfying the inequality (I) if the amount of power consumption $DE_1$ is equal to or less than the amount of electric power CE.

If at step S107 it is judged that there is no first sort section no. "k" satisfying the inequality (1), the control routine proceeds to step S108. At step S108, the driving plan generating part 61 sets the driving modes of all sections to the HV mode, After step S108, the present control routine ends. Note that, at step S108, the driving plan generating part 61 may set the driving mode of the section of the first sort section no. 1 to the EV mode and set the driving modes of the other sections to the HV mode. In this case, when the SOC of the battery 20 becomes less than the lower limit value at the section of the first sort section no. 1, the driving mode is changed from the EV mode to the HV mode. The lower limit value is preset considering deterioration of the battery 20 etc.

On the other hand, if at step S107 it is judged that there is a first sort section no, "k" satisfying the inequality (1), the control routine proceeds to step S109. At step S109, the driving plan generating part 61 calculates the first sort section no. "k" satisfying the inequality (1), Next, at step S110, the driving plan generating part 61, as shown in FIG. 4B, sets the driving mode of the sections from the first sort section no. 1 to the first sort section no. "k" (in the example shown in FIG. 4B, k=6) to the EV mode and sets the driving mode of the sections from the sort section no. k+1 to the first sort section no. "n" to the HV mode. Further, the driving plan generating part 61, as shown in FIG. 4C, generates the first driving plan by rearranging the sections in the order of the section nos.

Next, at step S111, the driving plan generating part 61 calculates the amount of fuel consumed due to driving over each of the sections (below, referred to as the "amount of driving fuel consumption") and calculates an amount of first driving fuel consumption DF1 which is the total of the amounts of driving fuel consumption when the vehicle 1 is driven over an entire driving route based on the first driving plan. Note that, in an EV section where the driving mode is set to the EV mode, the amount of driving fuel consumption becomes zero, while in an HV section where the driving mode is set to the HV mode, the amount of driving fuel consumption becomes larger than zero. The driving plan generating part 61 calculates the amount of driving fuel consumption of the HV section based on the driving load and distance of the HV section.

Further, at step S111, the driving plan generating part 61 calculates the amount of fuel consumed for warming up the catalyst 43 at each of the sections (below, "amount of warm-up fuel consumption") and calculates the amount of first warn-up fuel consumption HF1 which is the total of the amounts of warm-up fuel consumption when the vehicle 1 is driven over an entire driving route based on the first driving plan, Note that, in an EV section, the amount of warm-up fuel consumption becomes zero, while in an HV section, the amount of warm-up fuel consumption becomes larger than zero. The amount of first warm-up fuel consumption HF1 is calculated assuming the catalyst 43 is warmed up at only the initial IV section of the route.

Next, at step S112, the driving plan generating part 61 calculates the amount of first total fuel consumption TF1 which is the total of the amounts of fuel consumption when the vehicle 1 is driven over an entire driving route based on the first driving plan. The driving plan generating part 61 calculates the amount of first total fuel consumption TF1 as the total of the amount of first driving fuel consumption DF1 and the amount of first warm-up fuel consumption HF1 (TF1=DF1+HF1).

Figure 5A:
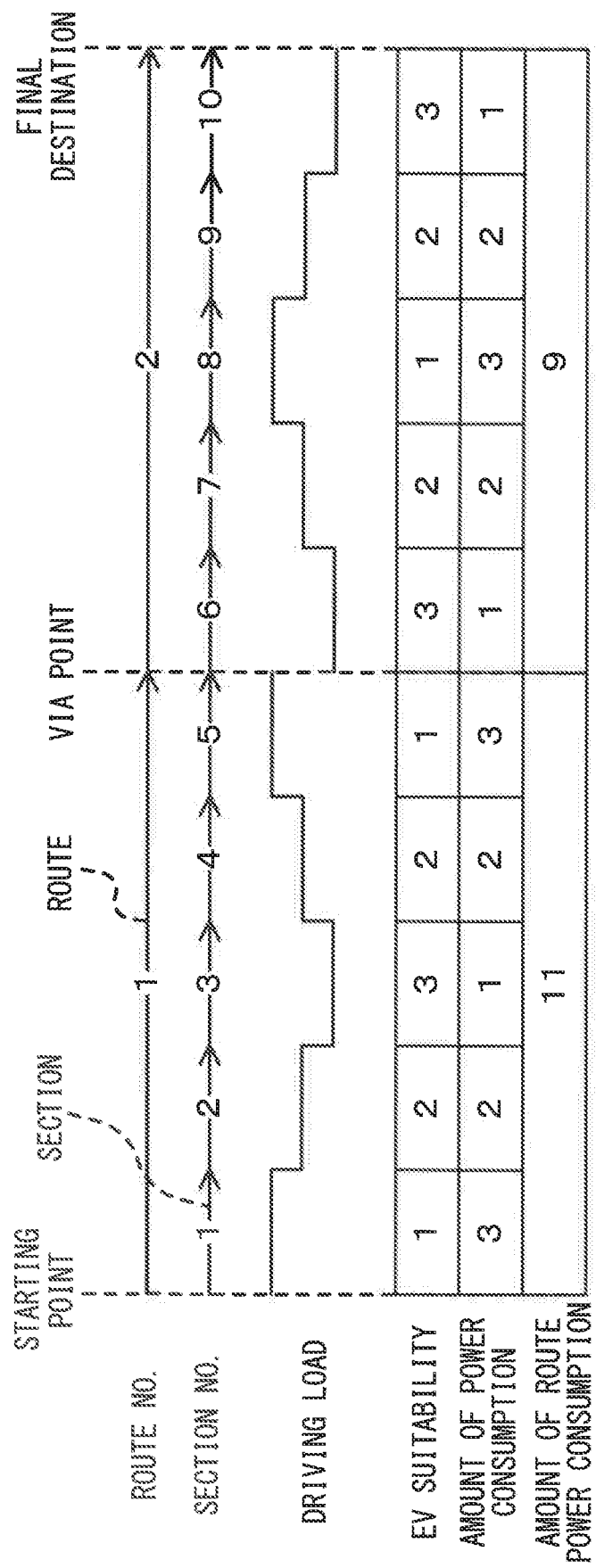
FIG. 5A is a view for explaining the generation of a second driving plan.

Next, at step S113, the driving plan generating part 61, as shown in FIG. 5A, calculates the amount of power consumption when the vehicle 1 is driven over each of routes by the EV mode (below, referred to as "the amount of route power consumption") based on the amounts of power consumption of the sections. The driving plan generating part 61 calculates the amount of route power consumption as the total of the amounts of power consumption of the sections of the route.

Next, at step S114, the driving plan generating part 61, as shown in FIG. 5B, performs second sort processing to rearrange the order of the routes. In the second sort processing, the order of the routes is rearranged based on the amount of route power consumption. Specifically, the routes are rearranged in the order of the smallest amount of route power consumption up. Furthermore, the driving plan generating part 61 assigns a sort route no. to each route in the rearranged order (i=1, . . . , n; in the example shown in FIG. 5B, n=2).

Next, at step S115, the driving plan generating part 61 judges whether there is a sort section no. "k" satisfying the following inequality (2):

$$RE_k \leq CE < RE_{k+1} \qquad (2)$$

Here, $RE_k$ is the total of the amounts of route power consumption of the routes from the sort route no. 1 to the sort route no. "k". $RE_{k+1}$ is the total of the amounts of route power consumption of the routes from the sort route no. 1 to the sort route no. k+1.

Specifically, the driving plan generating part 61 judges that there is no sort route no. "k" satisfying the inequality (2) if the amount of route power consumption $RE_1$ of the route when the sort route no. "k" is 1 is larger than the amount of electric power CE calculated at step S104. On the other hand, the driving plan generating part 61 judges that there is a sort route no. "k" satisfying the inequality (2) if the amount of route power consumption $RE_1$ is equal to or less than the amount of electric power CE.

If at step S115 it is judged that there is no sort route no. "k" satisfying the inequality (2), the control routine proceeds to step S126. At step S126, the driving plan generating part 61 employs the first driving plan as the driving plan. Next, at step S128, the driving plan generating part 61 calculates the target SOC of each of the sections based on the first driving plan. After step S128, the present control routine ends.

On the other hand, if at step S115 it is judged that there is a sort route no. "k" satisfying the inequality (2), the control routine proceeds to step S116. At step 116, the driving plan generating par 61 calculates the sort route no, "k" satisfying the inequality (2).

Next, at step S117, the driving plan generating pan 61, as shown in FIG. 5C, performs third sort processing on the sections of the routes from the sort route no. k+1 to the sort route no. "n" (in the example shown in FIG. 5C, k=1, n=2) to rearrange the order of the sections. In the example of FIG. 5C, the order of the sections of the first route is rearranged.

In the third sort processing, in the same way as the first sort processing, the order of the sections is rearranged based on the EV suitability, the amount of power consumption, and the section no. Specifically, the sections are rearranged in the order of the highest EV suitability down. Further, if the EV suitability is equal, the sections are rearranged in the order of the smallest amount of power consumption up. Further, if the EV suitability and the amount of power consumption are equal, the sections are rearranged in the order of the smallest section no. up. Furthermore, the driving plan generating part 61 assigns second sort section nos. to each section in the rearranged order (i=1, . . . , n; in the example shown in FIG. 5C, n=5).

Next, at step S118 the driving plan generating part 61 subtracts the total $RE_k$ of the amounts of route electric power consumption of the routes up to the sort route no. "k" from the amount of electric power CE calculated at step 104 to thereby calculate the amount of excess electric power ΔCE of the battery 20 (ΔCE=CE−$RE_k$).

Next, at step S119, the driving plan generating part 61 judges whether there is a second sort section no. "k" satisfying the following inequality (3):

$$EE_k \leq \Delta CE < EE_{k+1} \qquad (3)$$

Here, $EE_k$ is the total of the amounts of power consumption of the sections from the second sort section no. 1 to the second sort section no. "k". $EE_{k+1}$ is the total of the amounts of power consumption of the sections from the second sort section no. 1 to the second sort section no, k+1.

Specifically, the driving plan generating part 61 judges that there is no second sort section no, "k" satisfying the inequality (3) if the amount of power consumption $EE_1$ of the section when the second sort section no. "k" is 1 is larger than the amount of electric power CE. On the other hand, the driving plan generating part 61 judges that there is a second sort section no. "k" satisfying the inequality (3) if the amount of power consumption $EE_1$ is equal to or less than the amount of electric power CE.

Figure 5D:
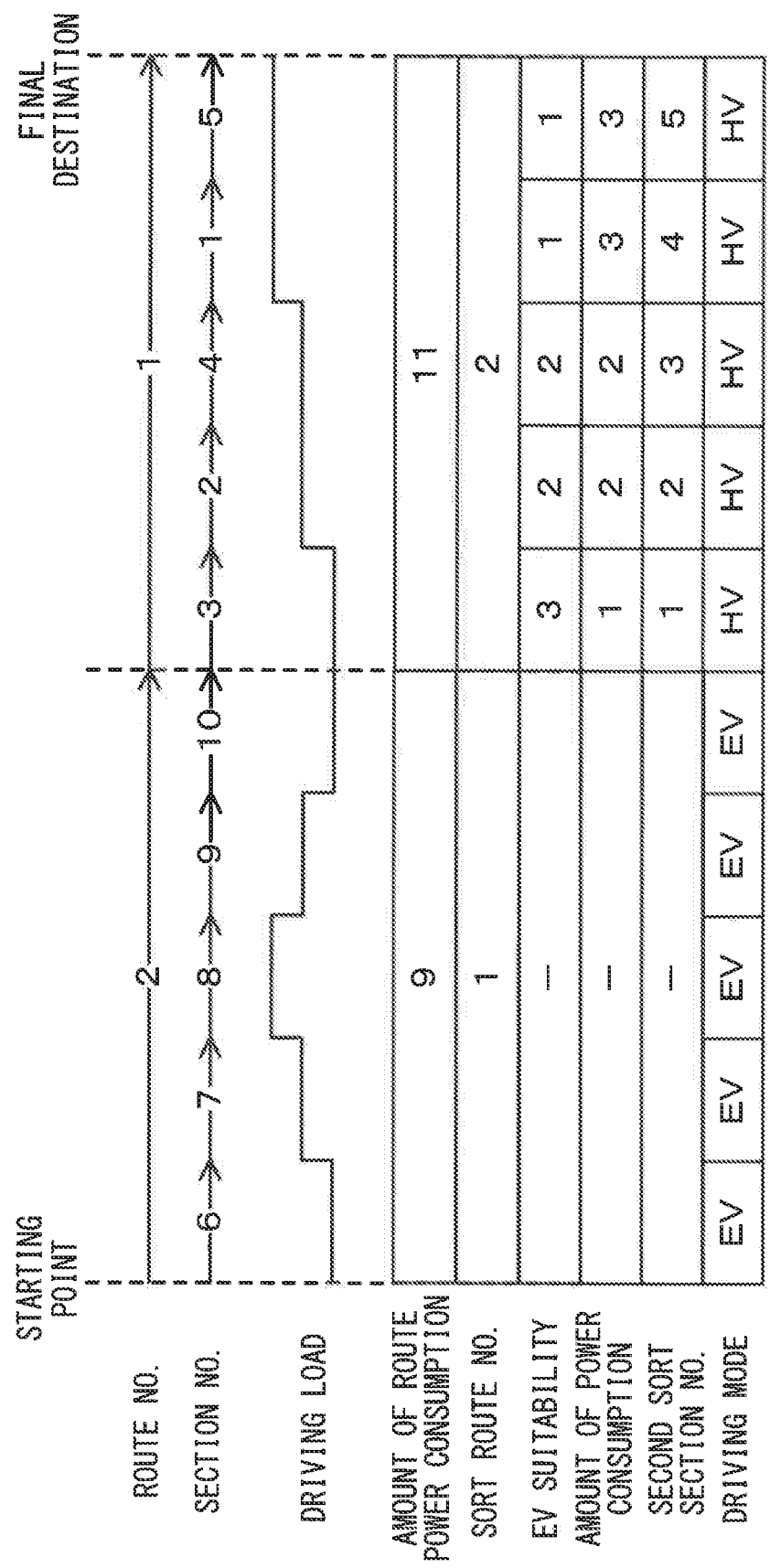
FIG. 5D is a view for explaining the generation of the second driving plan.
Figure 5E:
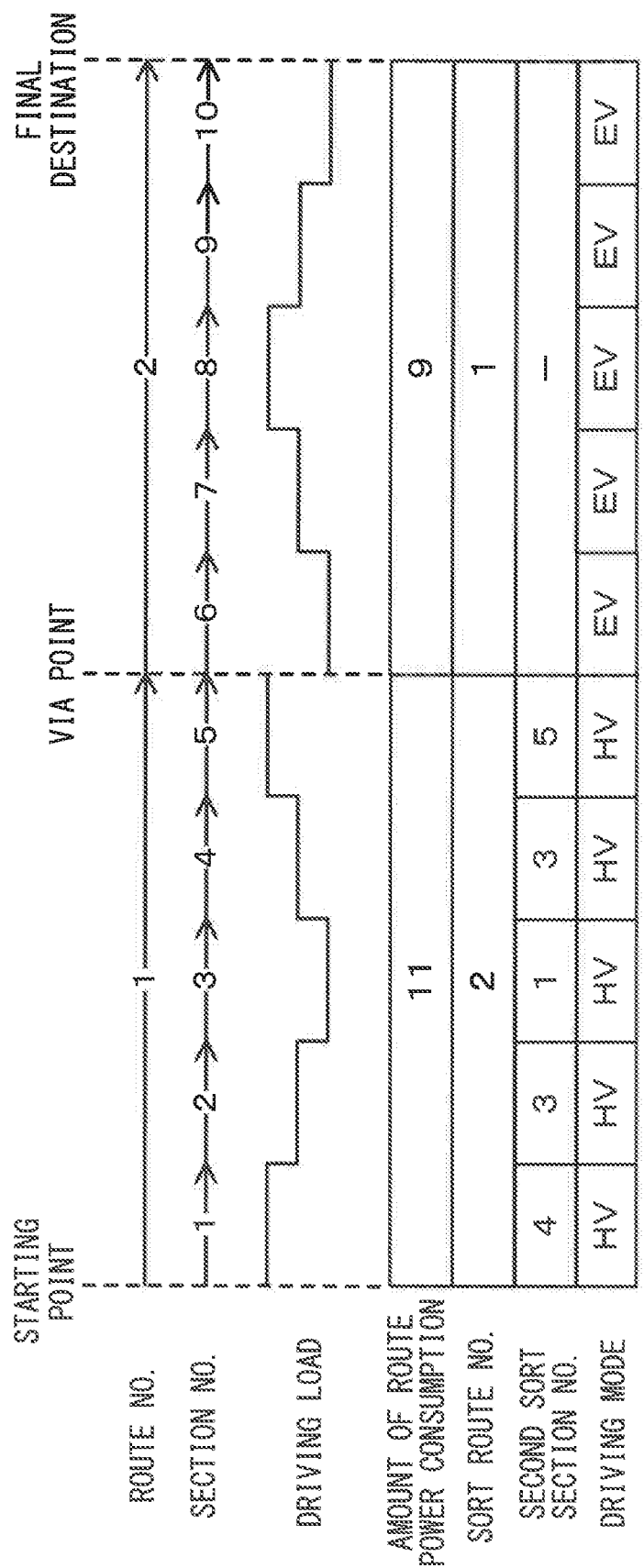
FIG. 5E is a view for explaining the generation of the second driving plan.

If at step S119 it is judged that there is no second sort section no. "k" satisfying the inequality (3), the control routine proceeds to step S120. At step S120, the driving plan generating part 61, as shown in FIG. 5D, sets the driving modes of all of the sections of the routes up to the sort route no. "k" (in the example of FIG. 5D, k=1) to the EV mode, and sets the driving modes of all of the sections of the routes from the sort route no. k+1 to the sort route no. "n" to the HV mode. Next, the driving plan generating part 61, as shown in FIG. 5E, rearranges the sections in the order of the section nos. to thereby generate a second driving plan.

On the other hand, if at step S119 it is judged that there is a second sort section no. "k" satisfying the inequality (3), the control routine proceeds to step S121. At step S121, the driving plan generating part 61 calculates the second sort section no. "k" satisfying the inequality (3).

Figure 5F:
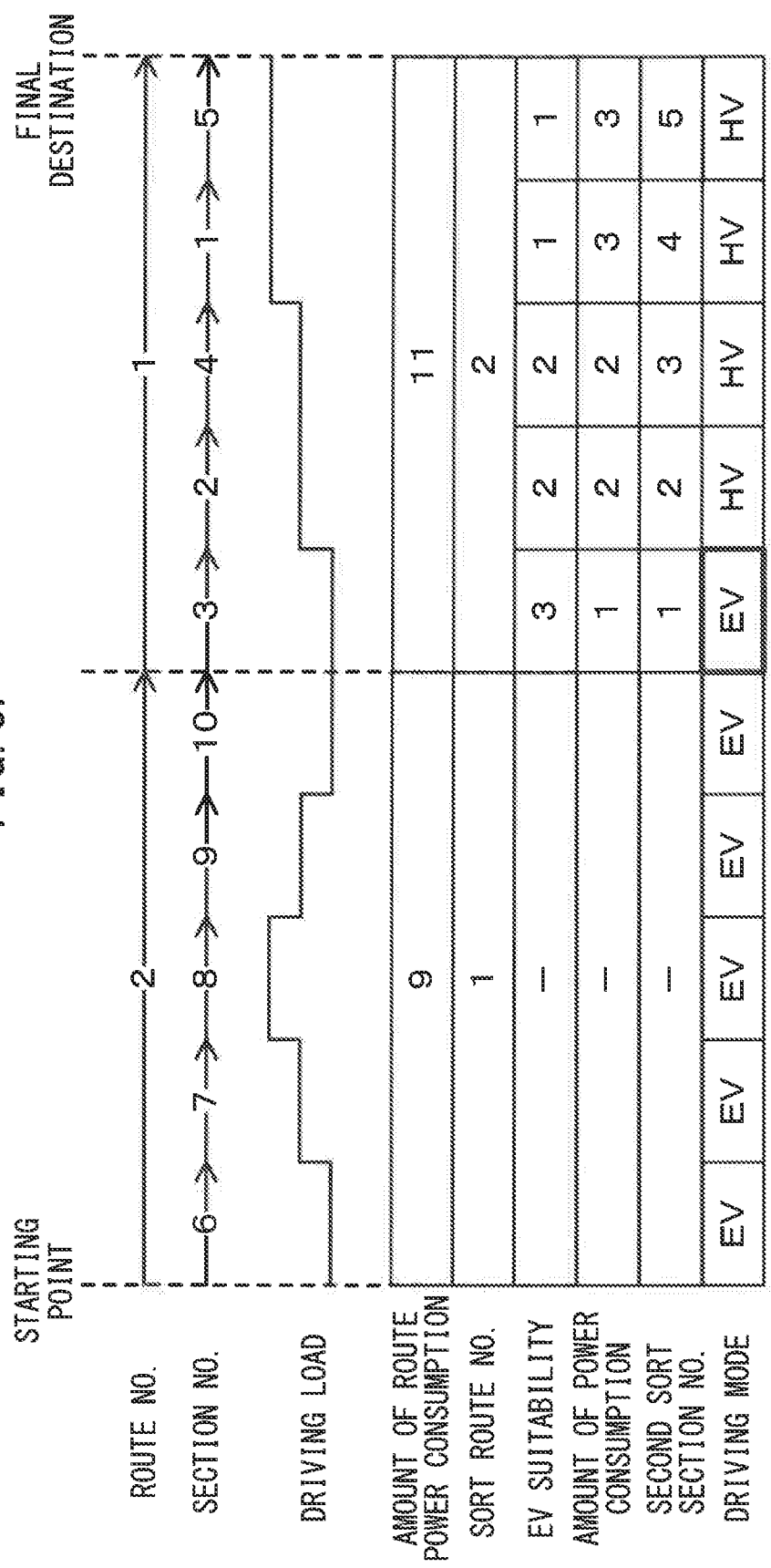
FIG. 5F is a view for explaining the generation of the second driving plan.

Next, at step S122, the driving plan generating part 61, as shown in FIG. 5F, sets the driving modes of all of the sections of the routes up to the sort route no. "k" (in the example of FIG. 5F, k=1) to the EV mode. Further, for the routes from the sort route no. k+1 to the sort route no. "n", the driving plan generating part 61 sets the driving modes of the sections from the second sort section no. 1 to the second sort section no. "k" (in the example shown in FIG. 5F, k=1) to the EV mode and sets the driving modes of the sections from the second sort section no. k+1 to the second sort section no. "n" to the HV mode. Next, the driving plan generating part 61 rearranges the sections in the order of the section nos. such as shown in FIG. 5G to generate a second driving plan.

After step S120 or step S122, at step S123, the driving plan generating part 61 calculates the amount of driving fuel consumption of each of the sections and calculates the amount of second driving fuel consumption DF2 which is the total of the amounts of driving fuel consumption when the vehicle 1 is driven over an entire driving route based on the second driving plan. The driving plan generating part 61 calculates the amount of driving fuel consumption of the HV section based on the driving load and distance of the HV section.

Further, at step S123, the driving plan generating part 61 calculates the amount of warm-up fuel consumption of each of the sections and calculates the amount of second warm-up fuel consumption HF2 which is the total of the amounts of warm-up fuel consumption when the vehicle 1 is driven over an entire driving route based on the second driving plan. The amount of second warm-up fuel consumption HF2 is calculated assuming that the catalyst 43 is warmed up only in the initial HV section of the route.

Next, at step S124, the driving plan generating part 61 calculates the amount of second total fuel consumption TF2 which is the total of the amounts of fuel consumption when the vehicle 1 is driven along the entire driving route based on the second driving plan. The driving plan generating part 61 calculates the amount of second total fuel consumption TF2 as the total of the amount of second driving fuel consumption DF2 and the amount of second warm-up fuel consumption HF2 (TF2=DF2+HF2).

Next, at step S125, the driving plan generating part 61 judges whether the amount of second total fuel consumption TF2 is equal to or less than the amount of first total fuel consumption TF1. If it is judged that the amount of second total fuel consumption TF2 is equal to or less than the amount of first total fuel consumption TF1, the control routine proceeds to step S127.

At step S127, the driving plan generating part 61 employs the second driving plan as the driving plan. Next, at step S128, the driving plan generating part 61 calculates the target SOC of each of the sections based on the second driving plan. After step S128, the present control routine ends.

On the other hand, if at step S125 it is judged that the amount of second total fuel consumption TF2 is larger than the amount of first total fuel consumption TF1, the control routine proceeds to step S126. At step S126, the driving plan generating part 61 employs the first driving plan as the driving plan. Next, at step S128, the driving plan generating part 61 calculates the target SOC of each of the sections based on the first driving plan. After step S128, the present control routine ends.

Note that, in the present control routine, it is also possible that only the second driving plan be generated and the second driving plan be employed as the driving plan.

<Deviation from Target SOC>

By driving the vehicle 1 based on the driving plan generated as explained above, it is possible to improve the fuel efficiency of the vehicle 1. However, sometimes the actual SOC of the battery 20 will deviate from the target SOC due to the driving conditions of the vehicle 1, the traffic conditions of the driving route, etc. For example, if the amount of electric power consumed in an air-conditioner provided in the vehicle 1 is large, if congestion occurs on the driving route etc., the amount of power consumption will become greater than anticipated and the actual SOC will become lower than the target SOC.

If the actual SOC becomes lower than the target SOC, to enable the vehicle 1 to reach the final destination, it is necessary to change the driving plan to make the actual SOC approach the target SOC. For example, it may be considered to change the the driving mode of a section where the driving mode is set to the EV mode to the HV mode. However, if the driving mode is changed from the EV mode to the HV mode in a section of an EV route, the catalyst 43 has to be warmed up at the EV route and the fuel efficiency of the vehicle 1 greatly deteriorates.

Therefore, in the present embodiment, the output control part 62 changes the driving mode set by the driving plan generating part 61 in a section of a non-EV route other than the EV route so that the actual SOC approaches the target SOC if the value of the target SOC of the battery 20 minus the actual SOC of the battery 20 becomes larger than a threshold value. Specifically, the output control part 62 changes the driving mode set by the driving plan generating part 61 from the EV mode to the HV mode so that the actual SOC is maintained in a section of a non-EV route if the value of the target SOC minus the actual SOC becomes larger than a threshold value.

At a non-EV route, the driving mode of at least one section is set to the HV mode and warm-up of the catalyst 43 is envisioned in the driving plan. For this reason, even if the driving mode is changed from the EV mode to the HV mode in a section of a non-EV route, the number of times of warm-up of the catalyst 43 performed on the non-EV route remains a single time. Therefore, according to the above control, when the actual SOC is made to approach the target SOC, it is possible to keep the number of times of warm-up of the catalyst 43 from increasing.

FIG. 6 is a view showing a specific example of control in the first embodiment of the present invention together with a comparative example. In the example of FIG. 6, there are two via points between a departure point and a final destination. For this reason, the route of the driving route is comprised of a first route from the departure point to a first via point, a second route from the first via point to a second via point, and a third route from the second via point to a final destination. The first route is divided into the three sections from the first section to the third section. The second route is divided into the four sections from the fourth section to the seventh section. The third route is divided into the three sections from the eighth section to the 10th section.

In the example of FIG. 6, the second driving plan is employed as the driving plan, the first route and the third route are EV routes, and the second route is a non-EV route. Further, the first section to the fourth section and the eighth section to the 10th section are EV sections, while the fifth section to the seventh section are HV sections.

FIG. 6 shows the driving mode, the target SOC, amount of driving fuel consumption, amount of warm-up fuel consumption, and amount of cumulative fuel consumption of sections in the case where the vehicle 1 is driven based on a driving plan. The amount of cumulative fuel consumption is the total amount of the fuel consumed up to the section in question. Therefore, the amount of cumulative fuel consumption is calculated by cumulatively adding the amounts of driving fuel consumption and the amounts of warm-up fuel consumption.

Further, in FIG. 6, the driving modes, actual SOCs, amounts of driving fuel consumption, amounts of warm-up fuel consumption, and amounts of cumulative fuel consumption when the controls of the Comparative Example 1, Comparative Example 2, and first embodiment are performed are shown. The actual SOC is calculated based on the output of the voltage sensor 51 etc. In FIG. 6, the target SOC, actual SOC, amount of driving fuel consumption, amount of warm-up fuel consumption, and amount of cumulative fuel consumption are expressed by simplified numerical values. The parameters become larger the larger the numerical values. Further, in FIG. 6, the target SOC and actual SOC are shown by values at the end point of the section. At the EV section, the target SOC and actual SOC become gradually lower in the section.

Figure 7:
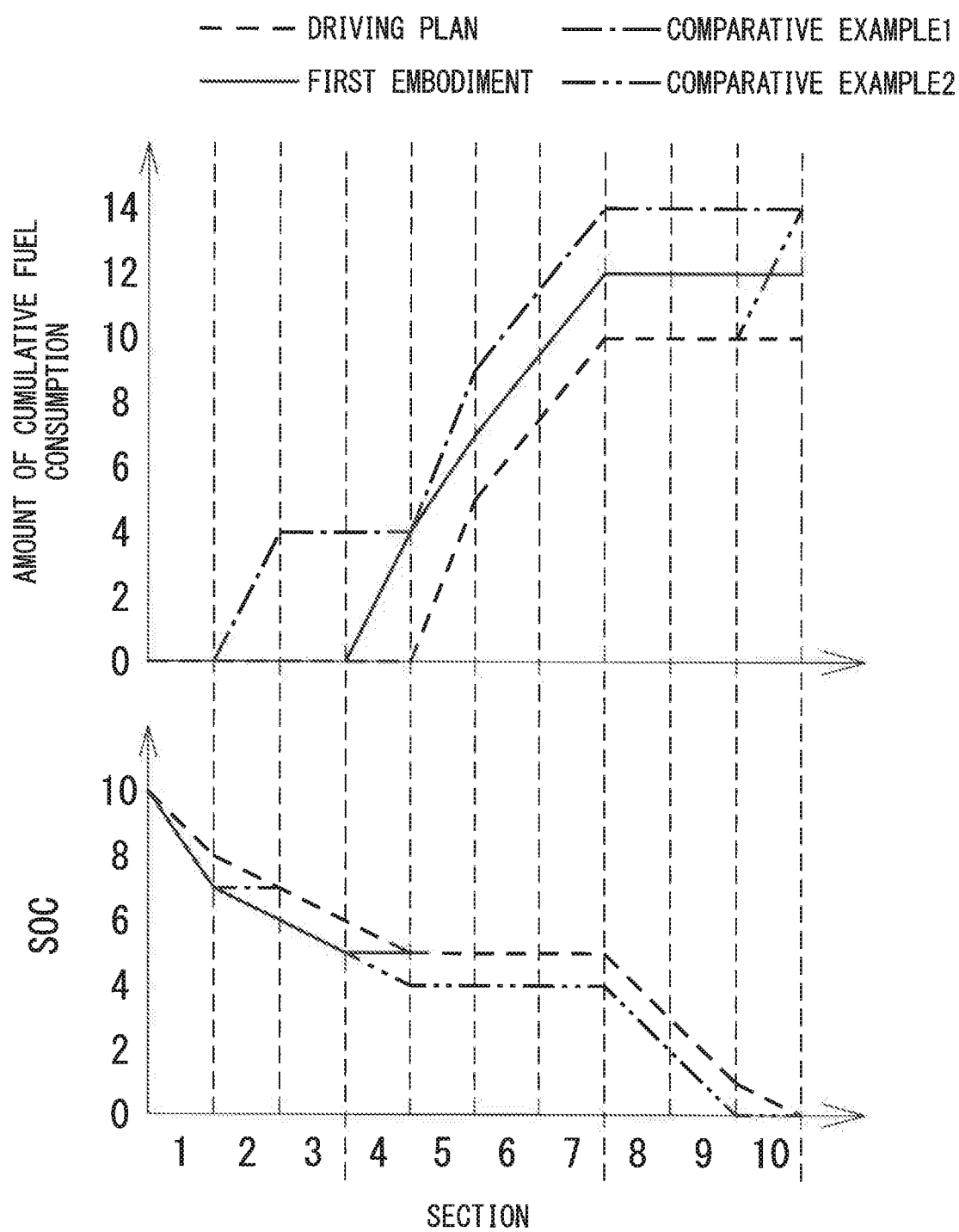
FIG. 7 is a view showing changes in amounts of cumulative fuel consumption and SOCs in a driving plan, Comparative Example 1, Comparative Example 2 and the first embodiment.

FIG. 7 is a view showing changes in amounts of cumulative fuel consumption and SOCs in a driving plan, Comparative Example 1, Comparative Example 2, and the first embodiment. In FIG. 7, the target SOC and amount of cumulative fuel consumption in the driving plan are shown by the broken lines, the actual SOC and amount of cumulative fuel consumption in Comparative Example 1 are shown by the one-dot chain lines, the actual SOC and amount of cumulative fuel consumption in Comparative Example 2 are shown by the two-dot chain lines, and the actual SOC and amount of cumulative fuel consumption in the first embodiment are shown by the solid lines.

As shown in FIG. 6 and FIG. 7, in Comparative Example 1, Comparative Example 2, and the first embodiment, at the first section, the amount of power consumption become larger than anticipated. At the end point of the first section, the actual SOC becomes lower than the target SOC. For this reason, the driving plan is changed to make the actual SOC approach the target SOC.

In Comparative Example 1, if the actual SOC falls from the target SOC, at the nearest EV section, the driving mode is changed from the EV mode to the HV mode so that the actual SOC approaches the target SOC. For this reason, in the second section, the driving mode is changed from the EV mode to the HV mode. As a result, at the second section, the actual SOC is maintained. At the end point of the second section, the actual SOC matches the target SOC. In Comparative Example 1, at the third section on, the actual SOC is equal to the target SOC.

In Comparative Example 2, even if the actual SOC falls from the target SOC, the driving plan is not changed until the actual SOC reaches the lower limit value. In the example of FIG. 6, at the end point of the ninth section, the actual SOC reaches the lower limit value (in this example, zero). For this reason, in the 10th section, the driving mode is changed from the EV mode to the HV mode. As a result, the actual SOC is maintained at the 10th section and the actual SOC matches the target SOC at the end point of the 10th section, that is, the final destination.

In Comparative Examples 1 and 2, the driving modes are changed from the EV mode to the HV mode on the EV routes. For this reason, at the EV route, the catalyst 43 is warmed up. Compared with the driving plan, the numbers of times of warm-up of the catalyst 43 increase. As a result, in Comparative Examples 1 and 2, the amounts of cumulative fuel consumption when the vehicle 1 reaches its final destination become much greater than in the driving plan.

On the other hand, in the first embodiment, if the actual SOC falls from the target SOC, at the nearest EV section of a non-EV route, the driving mode is changed from the EV mode to the HV mode so that the actual SOC approaches the target SOC. For this reason, the driving mode is changed from the EV mode to the HV mode at the fourth section. As a result, in the fourth section, the actual SOC is maintained. At the end point of the fourth section, the actual SOC matches the target SOC. In the first embodiment, at the fifth section on, the actual SOC is equal to the target SOC.

If the driving mode is changed from the EV mode to the HV mode at the fourth section, at the fourth section, which is the initial section of the second route, the catalyst 43 is warmed up and at the fifth section, the catalyst 43 is not warmed up. For this reason, in the first embodiment, the number of times of warm-up of the catalyst 43 becomes the same as the driving plan and the amount of cumulative fuel consumption increases by exactly the extent of the amount of driving fuel consumption in the fourth section. Therefore, in the first embodiment, it is possible to keep the number of times of warm-up of the catalyst 43 from increasing if the actual SOC falls from the target SOC and in turn keep the fuel efficiency from deteriorating.

<Processing for Changing Driving Plan>

FIG. 8 is a flow chart showing a control routine of processing for changing a driving mode in the first embodiment of the present invention. The present control routine is repeatedly executed by the ECU 60 at predetermined intervals.

First, at step S201, the output control part 62 judges whether the second driving plan has been employed as the driving plan. If it is judged that the first driving plan has been employed, the present control routine ends. On the other hand, if it is judged that the second driving plan has been employed, the control routine proceeds to step S202.

At step S202, the output control part 62 acquires the actual SOC (AS) of the battery 20. The actual SOC (AS) is calculated based on the output of the voltage sensor 51 etc. Next, at step S203, the output control part 62 acquires the target SOC (TS) of the battery 20 at the current position of the vehicle 1. The current position of the vehicle 1 is detected by the GPS receiver 52. The target SOC (TS) is set in the control routine of the processing for generating a driving plan of FIG. 3A and FIG. 3B.

Next, at step S204, the output control part 62 judges whether the value of the target SOC (TS) minus the actual SOC (AS) is larger than a first threshold value TH1. The first threshold value TH1 is predetermined and is set to a value of zero or more. The first threshold value TH1 is for example set to zero. In this case, at step S204, the output control part 62 judges whether the target SOC (TS) is larger than the actual SOC (AS). If at step S204 it is judged that the value of the target SOC (TS) minus the actual SOC (AS) is equal to or less than the first threshold value TH1, the control routine proceeds to step S205.

At step S205, the output control part 62 judges whether the value of the actual SOC (AS) minus the target SOC (TS) is larger than a second threshold value TH2. The second threshold value TH2 is predetermined and is set to a value of zero or more. The second threshold value TH2 may be the same as or different from the first threshold value TH1. The second threshold value TH2 is for example set to zero. In this case, at step S205, the output control part 62 judges whether the actual SOC (AS) is larger than the target SOC (TS). If at step S205 it is judged that the value of the actual SOC (AS) minus the target SOC (TS) is equal to or less than the second threshold value TH1, the present control routine ends.

On the other hand, if at step S205 it is judged that the value of the actual SOC (AS) minus the target SOC (TS) is larger than the second threshold value TH1, the control routine proceeds to step S206. In this case, the actual SOC (AS) is larger than the target SOC (TS). For this reason, at step S206, the output control part 62 changes the driving mode set by the driving plan generating part 61 so that the actual SOC (AS) approaches the target SOC (TS). Specifically, the output control part 62 changes the driving mode of an HV section to the EV mode so that the actual SOC (AS) becomes lower. After step S206, the present control routine ends.

Further, if it is judged at step S204 that the value of the target SOC (TS) minus the actual SOC (AS) is larger than the first threshold value TH1, the control routine proceeds to step S207. In this case, the actual SOC (AS) is smaller than the target SOC (TS).

At step S207, the output control part 62 judges whether the route being driven on is an EV route. If it is judged that the route being driven on is an EV route, the present control routine ends. On the other hand, if it is judged that the route being driven on is a non-EV route, the control routine proceeds to step S208.

At step S208, the output control part 62 changes the driving mode set by the driving plan generating part 61 so that the actual SOC (AS) approaches the target SOC (TS). Specifically, the output control part 62 changes the driving mode of an EV section to the HV mode so that the actual SOC (AS) is maintained. After step S208, the present control routine ends.

Note that, step S205 and step S206 may be omitted. Further, if only a second driving plan is generated at the control routine of the processing for generating a driving plan of FIG. 3A and FIG. 3B, step S201 may be omitted.

Second Embodiment

The control device of a hybrid vehicle according to a second embodiment is basically similar in configuration and control to the control device of a hybrid vehicle according to the first embodiment except for the points explained below. For this reason, below, the second embodiment of the present invention will be explained focusing on the parts different from the first embodiment.

In the second embodiment, if the value of the target SOC minus the actual SOC becomes larger than a threshold value, the output control part 62 changes the driving mode set by the driving plan generating part 61 from the EV mode or HV mode to the RE (Range Extender) mode at a section of a non-EV route so that the actual SOC becomes higher. By doing this, it is possible to make actual SOC approach the target SOC faster.

In the RE mode, the internal combustion engine 40 is operated and the engine load is fixed to a predetermined value regardless of the driving load. The predetermined value is predetermined and is set so that the heat efficiency of the internal combustion engine 40 becomes higher. In the RE mode, the output of the internal combustion engine 40 is used as drive use power and the supply of electric power from the battery 20 is stopped. Further, in the RE mode, the battery 20 is charged by electric power generated by a part of the output of the internal combustion engine 40 in accordance with the driving load. For this reason, in the RE mode, basically, the amount of electric power of the battery 20 increases and the SOC of the battery 20 becomes higher. Note that, the RE mode is also called the "SOC restoration mode".

Figure 10:
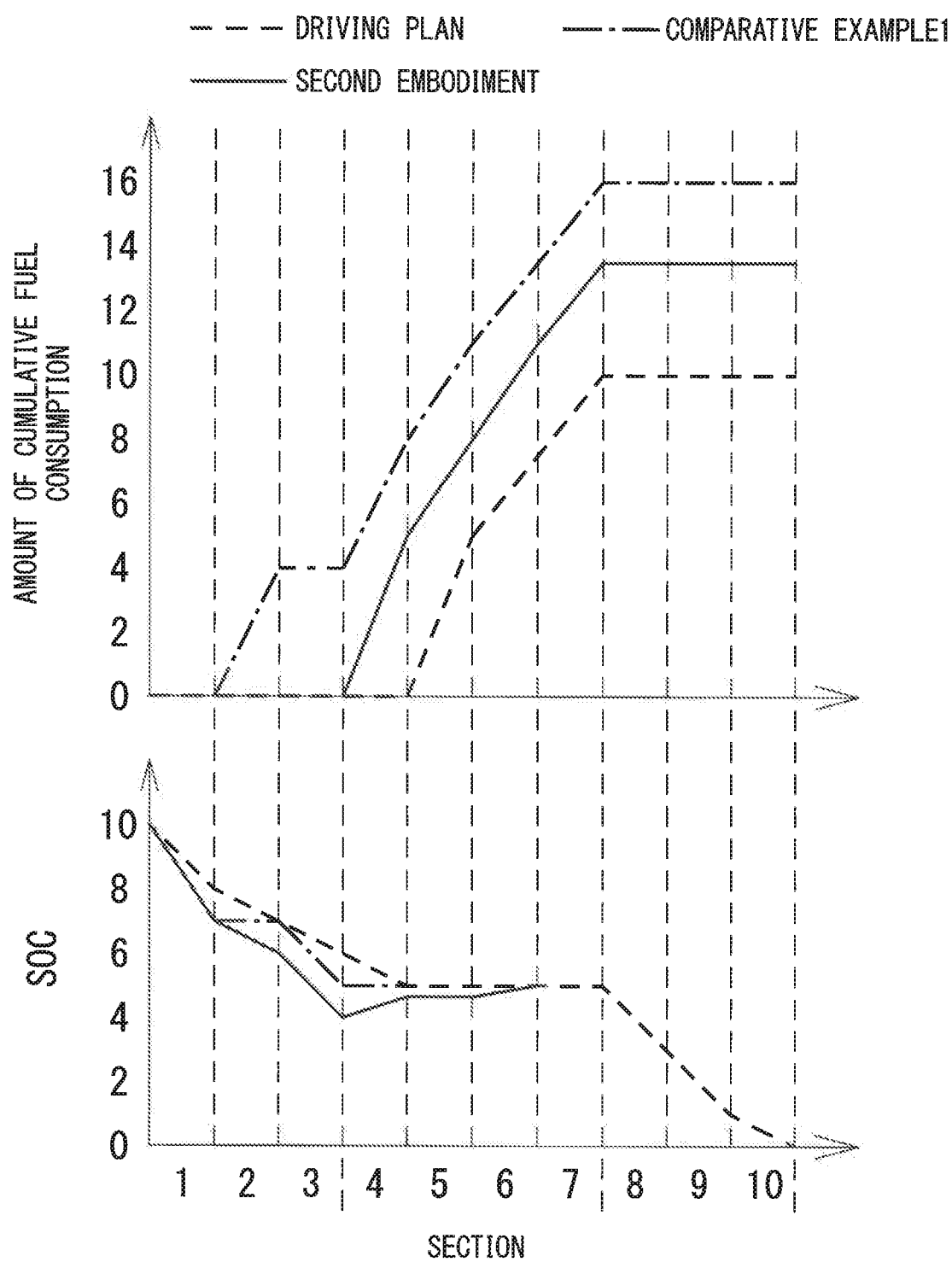
FIG. 10 is a view showing changes in amounts of cumulative fuel consumption and SOCs in a driving plan, Comparative Example 1 and the second embodiment.

FIG. 9 is a view showing a specific example of the control in the second embodiment of the present invention together with a comparative example and is similar to FIG. 6. FIG. 10 is a view showing changes in the amount of cumulative fuel consumption and SOC in a driving plan, Comparative Example 1, and the second embodiment. In FIG. 10, the target SOC and amount of cumulative fuel consumption at the driving plan are shown by broken lines, the actual SOC and amount of cumulative fuel consumption at Comparative Example 1 are shown by one-dot chain lines, and the actual SOC and amount of cumulative fuel consumption at the second embodiment are shown by solid lines.

As shown in FIG. 9 and FIG. 10, in Comparative Example 1 and the second embodiment, in the first section, the amount of power consumption become larger than anticipated. At the end point of the first section, the actual SOC become lower than the target SOC. For this reason, the driving plan is changed so as to make the actual SOC approach the target SOC.

In Comparative Example 1, if the actual SOC becomes lower than the target SOC, in the nearest EV section, the driving mode is changed from the EV mode to the HV mode so that the actual SOC approaches the target SOC. For this reason, in the second section, the driving mode is changed from the EV mode to the HV mode. As a result, in the second section, the actual SOC is maintained. At the end point of the second section, the actual SOC matches the target SOC.

Further, in the example of FIG. 9, in the third section as well, the amount of power consumption becomes larger than expected. At the end point of the third section, the actual SOC becomes lower than the target SOC as well. For this reason, in the fourth section, the driving mode is changed from the EV mode to the HV mode. As a result, in the fourth section, the actual SOC is maintained. At the end point of the fourth section, the actual SOC matches the target SOC. In Comparative Example 1, in the fifth section on, the actual SOC is equal to the target SOC.

In Comparative Example 1, on the first route of the EV route, the driving mode is changed from the EV mode to the HV mode. For this reason, the catalyst 43 is warmed up on the EV route and the number of times of warm-up of the catalyst 43 is increased compared with the driving plan. As a result, in Comparative Example 1, the amount of cumulative fuel consumption when the vehicle 1 reaches the final destination becomes much larger compared with the driving plan.

On the other hand, in the second embodiment, if the actual SOC falls from the target SOC, the driving mode is changed from the EV mode or HV mode to the RE mode at the nearest EV section or HV section of the non-EV route so that the actual SOC approaches the target SOC. For this reason, in the fourth section, the driving mode is changed from the EV mode to the RE mode. As a result, in the fourth section, the actual SOC becomes higher.

Further, in the example of FIG. 9, at the starting points of the fifth section and the sixth section as well, the actual SOC is lower than the target SOC. For this reason, in the fifth section and the sixth section, the driving mode is changed from the HV mode to the RE mode. In the fifth section, the driving load is extremely high, so substantially the entire output of the internal combustion engine 40 is used as drive use power and the battery 20 is not charged. For this reason, in the fifth section, the actual SOC is maintained. On the other hand, in the sixth section, the actual SOC becomes higher. At the end point of the sixth section, the actual SOC matches the target SOC. In the second embodiment, at the seventh section on, the actual SOC is equal to the target SOC.

If the driving mode is changed to the RE mode at the fourth section to the sixth section, the catalyst 43 is warmed up at the fourth section which is the initial section of the second route. In the fifth section, the catalyst 43 is not warmed up. For this reason, at the first embodiment, the number of times of warm-up of the catalyst 43 becomes the same as the driving plan. The amount of cumulative fuel consumption increases by exactly the amount of driving fuel consumption due to the RE mode. Therefore, in the second embodiment, if the actual SOC falls from the target SOC, it is possible to keep the number of times of warm-up of the catalyst 43 from increasing and in turn it is possible to keep the fuel efficiency from deteriorating. Further, in the second embodiment, even if the actual SOC greatly falls, it is possible to change the driving mode to the RE mode and thereby restore the actual SOC to the target SOC.

<Processing for Changing Driving Mode>

Figure 11:
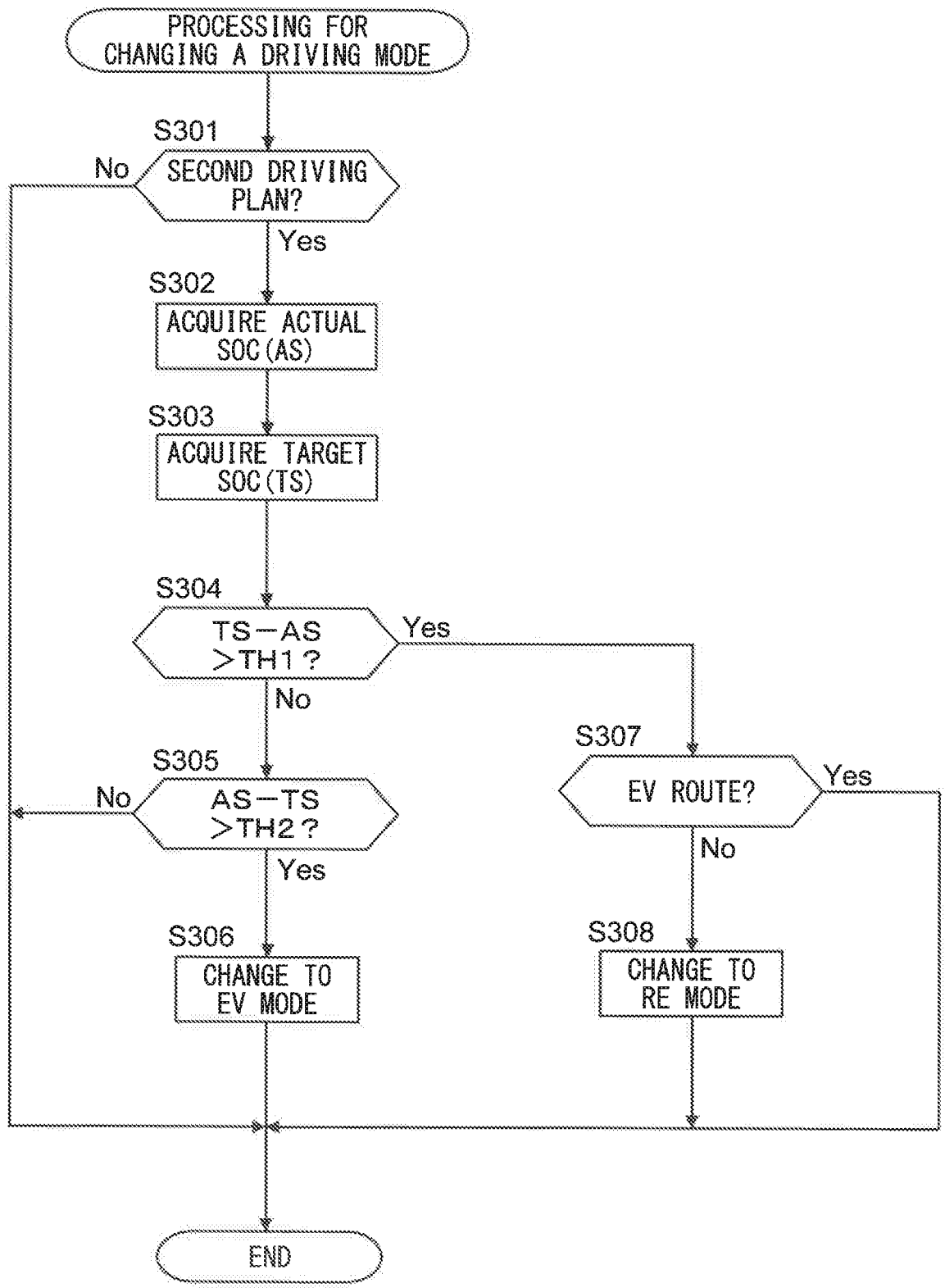
FIG. 11 is a flow chart showing a control routine of processing for changing a driving mode in the second embodiment of the present invention.

FIG. 11 is a flow chart showing a control routine of processing for changing a driving mode in the second embodiment of the present invention. The present control routine is repeatedly executed by the ECU 60 at predetermined intervals, Step S301 to step S307 are similar to step S201 to S207 of FIG. 8, so explanations will be omitted.

If at step S307 it is judged that the route being driven on is a non-EV route, the control routine proceeds to step S308. At step S308, the output control part 62 changes the driving mode set by the driving plan generating part 61 so that the actual SOC (AS) approaches the target SOC (TS), Specifically, the output control part 62 changes the driving mode of a section where the driving mode is set to the EV mode or HV mode to the RE mode so that the actual SOC (AS) becomes higher. After step S308, the present control routine ends.

Note that, step S305 and step S306 may be omitted. Further, if only the second driving plan is generated at the control routine of the processing for generating a driving plan of FIG. 3A and FIG. 3B, step S301 may be omitted.

Third Embodiment

The control device of a hybrid vehicle according to a third embodiment is basically similar in configuration and control to the control device of a hybrid vehicle according to the first embodiment except for the points explained below. For this reason, below, the third embodiment of the present invention will be explained focusing on the parts different from the first embodiment.

As explained above, at the HV mode, the SOC of the battery 20 is maintained substantially constant. On the other hand, at the RE mode, basically the SOC of the battery 20 becomes higher. Further, if the difference between the actual SOC and the target SOC at the end point of the non-EV route is large, it is impossible to quickly make the actual SOC approach the target SOC by just maintaining the actual SOC at the non-EV route. If the state of a large difference of the target SOC and the actual SOC is maintained, at an EV route, the actual SOC is liable to reach the lower limit value and the driving mode is liable to be changed from the EV mode to the HV mode. Further, when the actual SOC approaches the target SOC, if always changing the driving mode to the RE mode, the amount of driving fuel consumption increases and the fuel efficiency of the vehicle 1 deteriorates.

For this reason, in the third embodiment, if the value of the target SOC at the end point of the non-EV route minus the actual SOC is larger than a predetermined value, the output control part 62 changes the driving mode set by the driving plan generating part 61 from the EV mode or HV mode to the RE mode at a section of the non-EV route so that the actual SOC becomes higher. Further, if the value of the target SOC at the end point of the non-EV route minus the actual SOC is equal to or less than the predetermined value, the output control part 62 changes the driving mode set by the driving plan generating part 61 from the EV mode to the HV mode so that the actual SOC is maintained at a section of the non-EV route. By doing this, if actual SOC falls from the target SOC, it is possible to more effectively suppress an increase in the number of times of warm-up of the catalyst 43.

<Processing for Changing Driving Mode>

Figure 12:
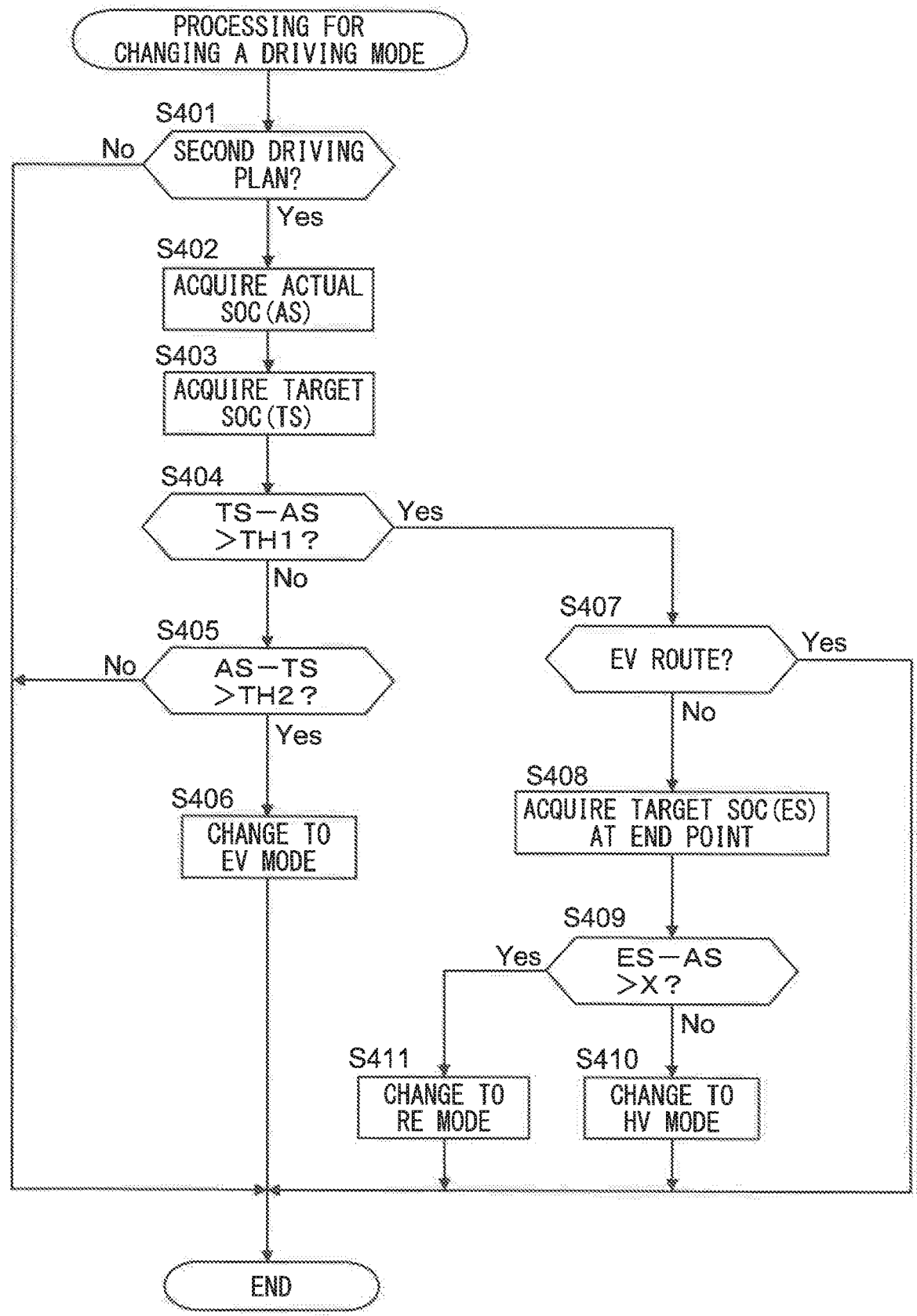
FIG. 12 is a flow chart showing a control routine of processing for changing a driving mode in a third embodiment of the present invention.

FIG. 12 is a flow chart showing a control routine of processing for changing a driving mode in the third embodiment of the present invention. The present control routine is repeatedly executed by the ECU 60 at predetermined intervals. Step S401 to step S407 are similar to step S201 to S207 of FIG. 8, so explanations will be omitted.

If at step S407 it is judged that the route being driven on is a non-EV route, the control routine proceeds to step S408. At step S408, the output control part 62 acquires the target SOC (ES) at the end point of the non-EV route.

Next, at step S409, the output control part 62 judges whether the value of the target SOC (ES) at the end point of the non-EV route minus the actual SOC (AS) is larger than a predetermined value X. The predetermined value X may be the same as the first threshold value TH1 or second threshold value TH2 or may be different. The predetermined value X is for example set to zero. In this case, at step 409, the output control part 62 judges whether the target SOC (ES) at the end point of the non-EV route is larger than the actual SOC (AS).

If at step S409 it is judged that the value of the target SOC (ES) at the end point of the non-EV route minus the actual SOC (AS) is equal to or less than a predetermined value X, the control routine proceeds to step S410. At step S410, the output control part 62 changes the driving mode of the EV section to the HV mode so that that actual SOC (AS) is maintained. After step S410, the present control routine is ended.

On the other hand, if at step S409 it is judged that the value of the target SOC (ES) at the end point of the non-EV route minus the actual SOC (AS) is larger than the predetermined value X, the control routine proceeds to step S411. At step S411, the output control part 62 changes the driving mode of an EV section or V section to the RE mode so that that actual SOC (AS) becomes higher. After step S411, the present control routine is ended.

Note that, step 2405 and step S406 may be omitted. Further, if only the second driving plan is generated in the control routine of the processing for generating a driving plan of FIG. 3A and FIG. 3B, step 2401 may be omitted.

Fourth Embodiment

The control device of a hybrid vehicle according to a fourth embodiment is basically similar in configuration and control to the control device of a hybrid vehicle according to the first embodiment except for the points explained below. For this reason, below, the fourth embodiment of the present invention will be explained focusing on the parts different from the first embodiment.

Figure 13:
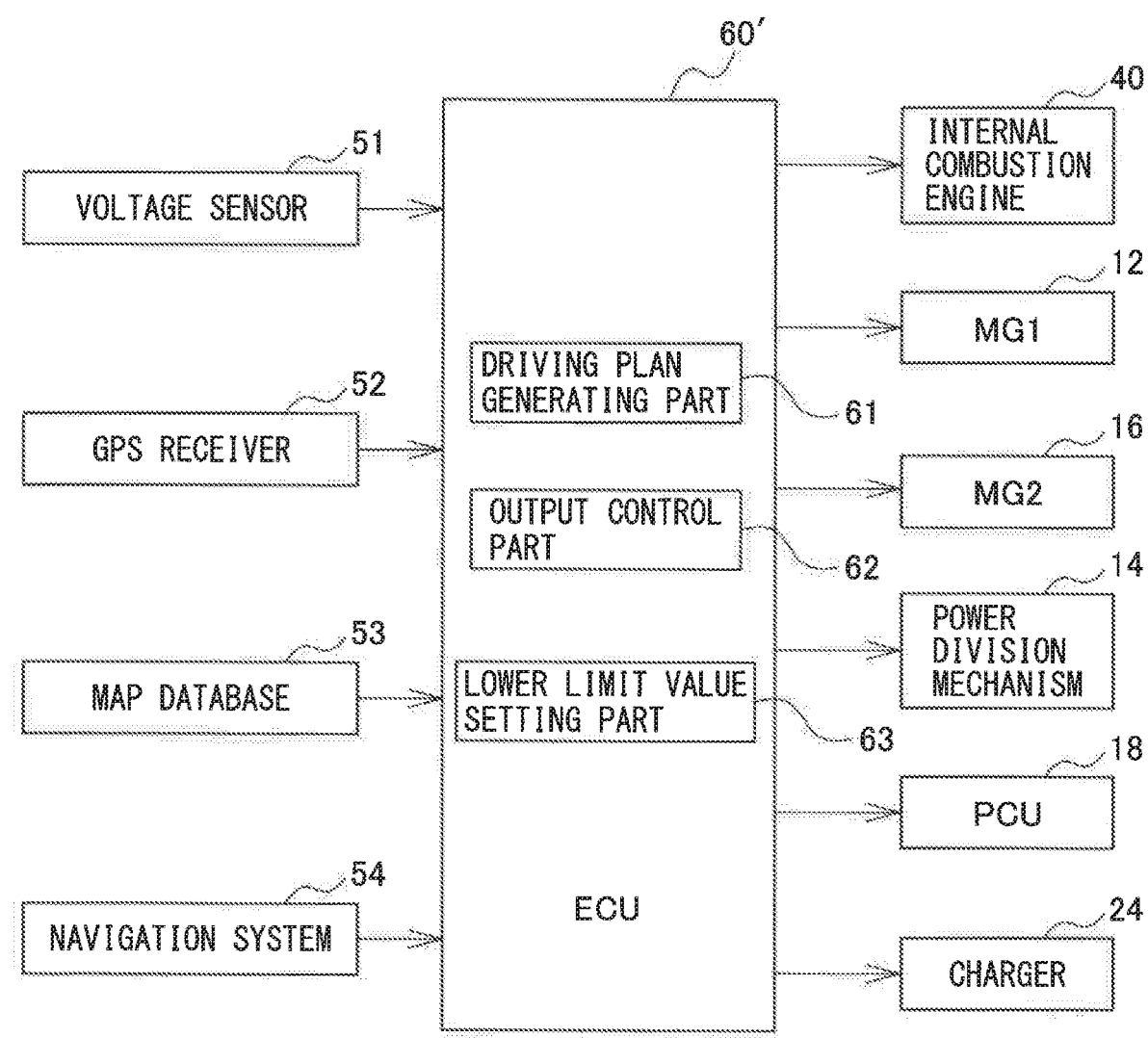
FIG. 13 is a block diagram schematically showing the configuration of a control device of a hybrid vehicle etc., according to a fourth embodiment of the present invention.

FIG. 13 is a block diagram schematically showing the configuration of a control device of a hybrid vehicle according to the fourth embodiment of the present invention. In the fourth embodiment, the ECU 60' runs programs etc., stored in the memory to thereby function as a driving plan generating part 61, output control part 62, and lower limit value setting part 63. Therefore, the control device of the vehicle 1 is provided with the driving plan generating part 61, output control part 62, and lower limit value setting part 63.

The lower limit value setting part 63 sets the lower limit value of the SOC of the battery 20. The output control part 62 changes the driving mode set by the driving plan generating part 61 so that the actual SOC is maintained or becomes higher if the actual SOC of the battery 20 reaches the lower limit value.

If the driving mode is changed from the EV mode to the HV mode or RE mode on an EV route, the number of times of warm-up of the catalyst 43 increases and the fuel efficiency of the vehicle 1 greatly deteriorates. For this reason, in the fourth embodiment, the lower limit value setting part 63 lowers the lower limit value on an EV route compared with a non-EV route. By doing this, the possibility of the driving mode being changed on the EV route becomes lower and the number of times of warm-up of the catalyst 43 can be kept from increasing.

Further, if the SOC of the battery 20 becomes excessively lower, the extent of deterioration of the battery 20 becomes greater. For this reason, the lower limit value setting part 63 lowers the lower limit value on an EV route when the driving mode is maintained at the EV mode on an EV route only if the actual SOC does not reach a reference value. The reference value is set in advance so that the extent of deterioration of the battery 20 does not becomes larger and is set to a value lower than the lower limit value at a non-EV route. By doing this, it is possible to keep the battery 20 from deteriorating while keeping the number of times of warm-up of the catalyst 43 from increasing.

Processing for Changing Driving Mode

Figure 14A:
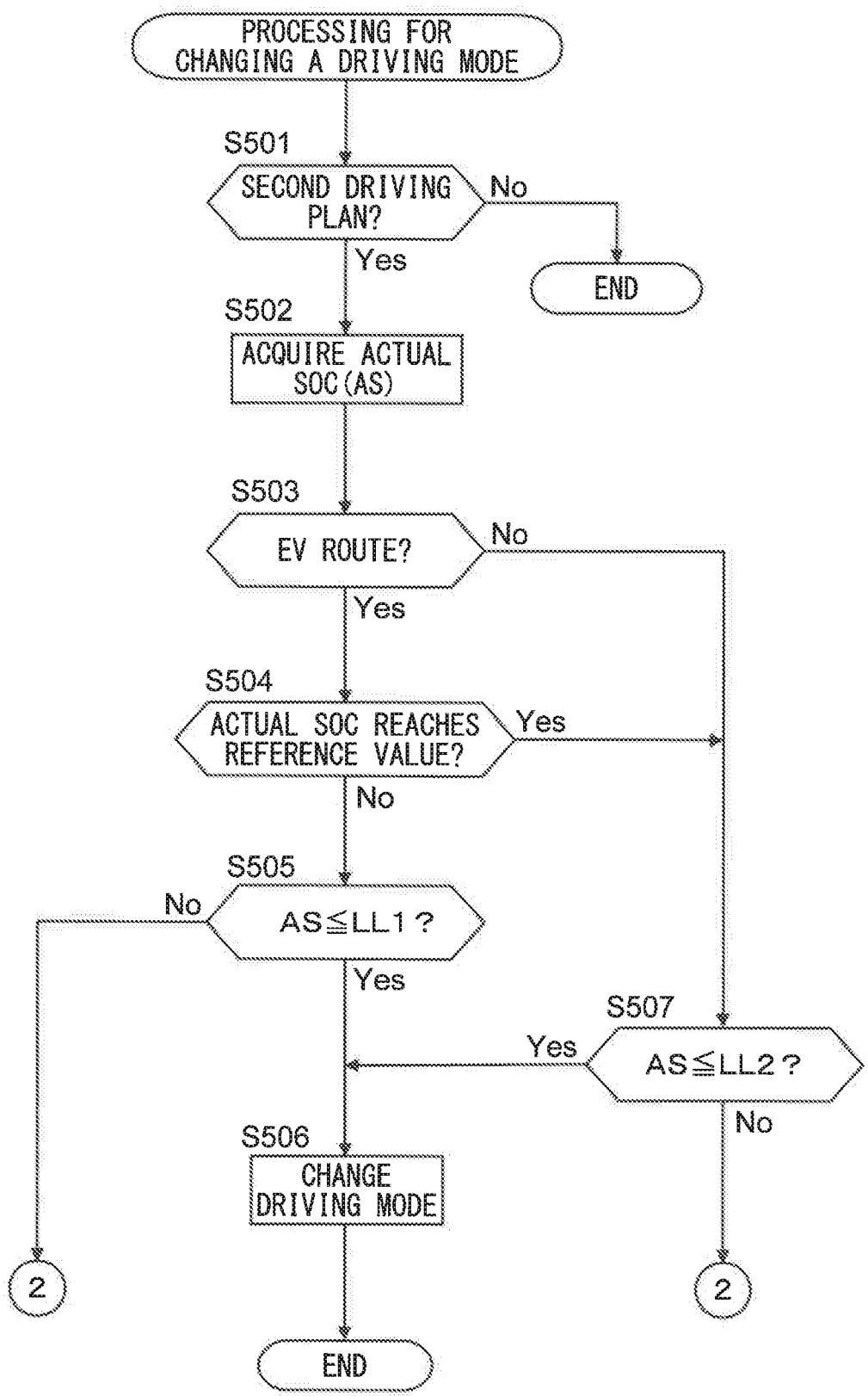
FIG. 14A is a flow chart showing a control routine of processing for changing a driving mode in the fourth embodiment of the present invention.
Figure 14B:
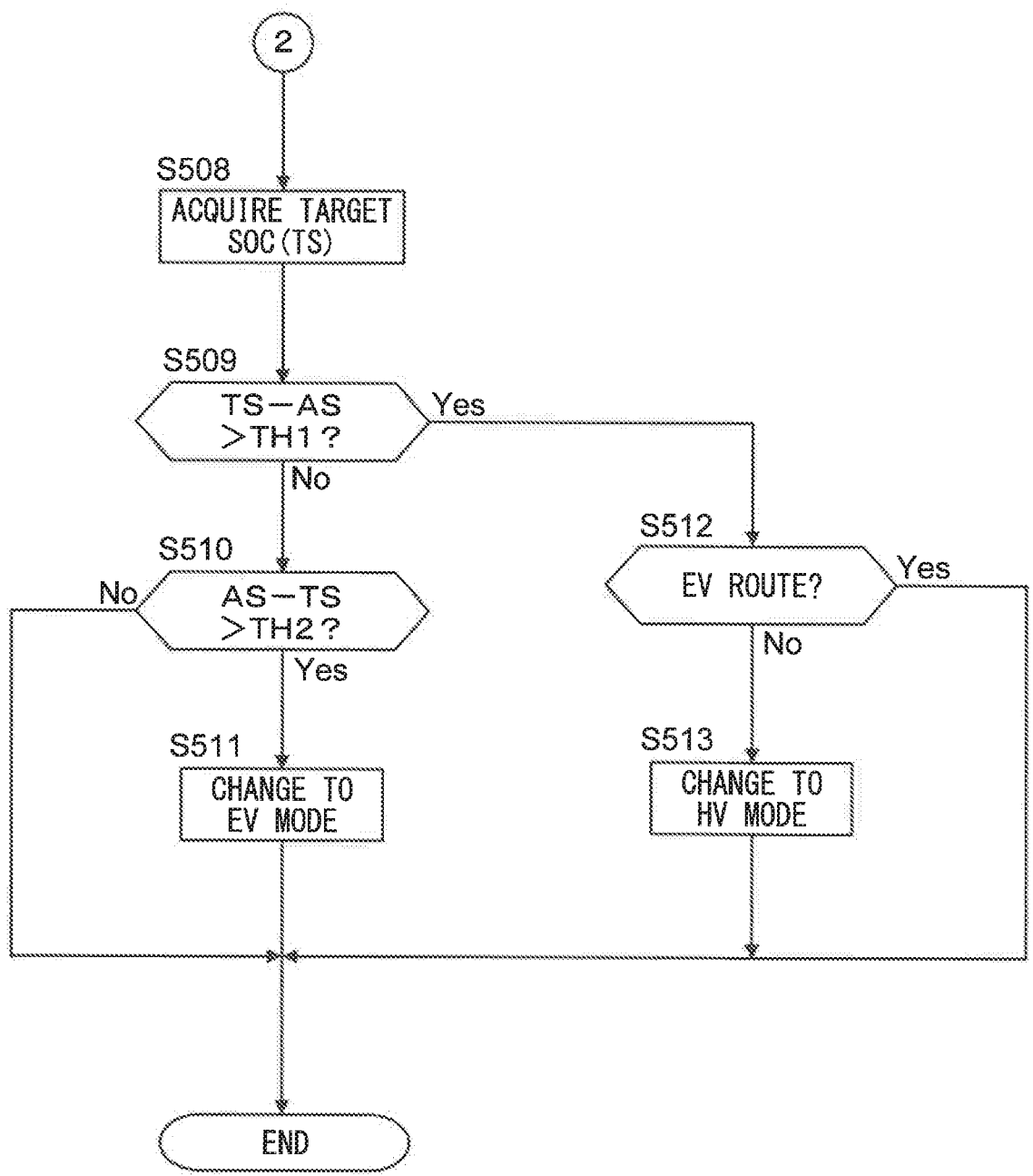
FIG. 14B is a flow chart showing a control routine of processing for changing a driving mode in the fourth embodiment of the present invention.

FIG. 14A and FIG. 14B are flow charts showing the control routine of the processing for changing a driving mode in the fourth embodiment of the present invention. The present control routine is repeatedly performed by the ECU 60 at predetermined intervals.

First, at step S501, the output control part 62 judges whether the second driving plan has been employed as the driving plan. If it is judged that the first driving plan has been employed, the present control routine ends. On the other hand, if it is judged that the second driving plan has been employed, the control routine proceeds to step S502.

At step S502, the output control part 62 acquires the actual SOC (AS) of the battery 20. The actual SOC (AS) is calculated based on the output of the voltage sensor 51 etc.

Next, at step S503, the lower limit value setting part 63 judges whether the route being driven on is an EV route. If it is judged that the route being driven on is an EV route, the control routine proceeds to step S504. At step S504, the lower limit value setting part 63 judges whether the actual SOC will reach the reference value when the driving mode is maintained at the EV mode on the EV route. The reference value is predetermined and is set to a value lower than the lower limit value on the HV route (second lower limit value LL2).

If it is judged at step S503 that the route being driven on is a non-EV route or if it is judged at step S504 that the actual SOC will reach the reference value, the control routine proceeds to step S507. At step S507, the lower limit value setting part 63 sets the lower limit value to the second lower limit value LL2 and the output control part 62 judges whether the actual SOC (AS) is equal to or less than the second lower limit value LL2. The second lower limit value LL2 is preset.

If at step S507 it is judged that the actual SOC (AS) is higher than the second lower limit value LL2, the control routine proceeds to step S508. Step S508 to step S513 are similar to step S203 to S208 of FIG. 8, so the explanation will be omitted.

Further, if at step S504 it is judged that the actual SOC will not reach the reference value, the control routine proceeds to step S505. At step S505, the lower limit value setting part 63 sets the lower limit value to the first lower limit value LL1, and the output control part 62 judges whether the actual SOC (AS) is equal to or less than the first lower limit value LL1. The first lower limit value LL1 is predetermined and is set to a value lower than the second lower limit value LL2. Note that, the first lower limit value LL1 may be the same as the reference value.

If it is judged that the actual SOC (AS) is higher than the first lower limit value ELI, the control routine proceeds to step S508. Step S508 to step S513 are similar to step S203 to S208 of FIG. 8, so explanations will be omitted.

If at step S507 it is judged that the actual SOC (AS) is equal to or less than the second lower limit value LL2 or if at step S505 it is judged that the actual SOC (AS) is equal to or less than the first lower limit value LL1, the control routine proceeds to step S506. At step S506, the output control part 62 changes the driving mode set by the driving plan generating part 61. Specifically, the output control part 62 changes the driving mode from the EV mode or HV mode to the RE mode so that the actual SOC becomes higher. After step S506, the present control routine is ended.

Note that, step S504 may be omitted. Further, at step S506, the output control part 62 may change the driving mode from the EV mode to the HV mode so that the actual SOC is maintained. Further, step S510 and step S511 may be omitted. Further, if only the second driving plan is generated in the control routine of the processing for generating a driving plan of FIG. 3A and FIG. 3B, step S501 may be omitted.

Fifth Embodiment

The control device of a hybrid vehicle according to a fifth embodiment is basically similar in configuration and control to the control device of a hybrid vehicle according to the first embodiment except for the points explained below. For this reason, below, the fifth embodiment of the present invention will be explained focusing on the parts different from the first embodiment.

FIG. 15 is a block diagram schematically showing the configuration of the control device of a hybrid vehicle according to the fifth embodiment of the present invention. In the fifth embodiment, the control device of a hybrid vehicle is comprised of the ECU 60" and server 80. The ECU 60" and server 80 are respectively provided with communication interfaces and can communicate with each other through a network 90. Note that, the server 80 can communicate with not only the vehicle 1', but also a plurality of other vehicles.

The server 80 is provided with, in addition to a communication interface, a central processing unit (CPU), a memory like a random access memory (RAM), a hard disk drive, etc. The server 80 runs a program stored in the hard disk drive etc., to function as the driving plan generating part 61. Further, the server 80 is provided with a map database 53, and the driving plan generating part 61 can obtain road information from the map database 53. On the other hand, the ECU 60" runs a program stored in the memory etc., to function as the output control part 62.

In the fifth embodiment, instead of the ECU 60" of the vehicle 1', a driving plan is generated by the server 80. For this reason, it is possible to reduce the processing load of the ECU 60" and in turn possible to reduce the manufacturing cost of the ECU 60". Note that, in the fifth embodiment as well, in the same way as the first embodiment, the control routine of the processing for generating a driving plan of FIG. 3A and FIG. 3B and the control routine of the processing for changing a driving mode of FIG. 8 are executed.

Other Embodiments

Above, preferred embodiments of the present invention were explained, but the present invention is not limited to these embodiments and can be corrected and changed in various ways within the language of the claims.

For example, at the exhaust passage 41 of the internal combustion engine 40, two or more catalysts may be provided. Further, the first motor-generator 12 may be a generator not functioning as a motor. Further, the second motor-generator 16 may be a motor not functioning as a generator.

Further, the vehicle 1 is a so-called "series-parallel type" hybrid vehicle. However, the vehicle may be a so-called "series type", "parallel type", or other type of hybrid vehicle. Further, the vehicle 1 need not be a plug-in hybrid vehicle. That is, the battery 20 need not be charged by the outside power source 70.

Further, the above embodiments can be worked combined in any way. For example, the fourth embodiment can be combined with the second embodiment or third embodiment. If the fourth embodiment is combined with the second embodiment, step S503 to step S507 of FIG. 14A are performed between step S302 and step S303 of FIG. 11. If the fourth embodiment is combined with the third embodiment, step S503 to step S507 of FIG. 14A are performed between step S402 and step S403 of FIG. 12.

Further, the fifth embodiment can be combined with the second embodiment, the third embodiment, or the fourth embodiment. If the fifth embodiment is combined with the second embodiment, the third embodiment, or the fourth embodiment, in the second embodiment, the third embodiment, or the fourth embodiment, the server 80 functions as the driving plan generating part 61.

REFERENCE SIGNS LIST

1, 1' hybrid vehicle
16 second motor-generator
20 battery
40 internal combustion engine
41 exhaust passage
43 catalyst
60, 60', 60" electronic control unit (ECU)
61 driving plan generating part
62 output control part

The invention claimed is:

1. A control device of a hybrid vehicle that includes an internal combustion engine in which a catalyst is provided in an exhaust passage, a motor, and a battery supplying electric power to the motor and configured to be charged by an output of the internal combustion engine,
   the control device controlling the hybrid vehicle and comprising:
   an Electronic Control Unit configured to:
   (i) set in advance a driving mode and a target state of charge of the battery when the hybrid vehicle is being driven; and
   (ii) control outputs of the internal combustion engine and the motor based on the driving mode, wherein
   the Electronic Control Unit is further configured to, when the hybrid vehicle is being driven from a departure point through at least one via point to a final destination, divide each of a plurality of routes each having the via point as at least one of a starting point and an end point into a plurality of sections, and set the driving mode of all of the sections of at least one route of the plurality of routes to an EV mode in which the internal combustion engine is stopped and drive use power is output by only the motor, and
   the Electronic Control Unit is further configured to, when a value of the target state of charge minus an actual state of charge of the battery becomes larger than a threshold value, change the driving mode that has been set so that the actual state of charge approaches the target state of charge in one of the sections of a non-EV route, which is one of the routes other than the EV route in which the driving modes of all of the sections are set to the EV mode.

2. The control device according to claim 1, wherein the Electronic Control Unit is configured to, when the value of the target state of charge minus the actual state of charge becomes larger than the threshold value, change the driving mode that has been set so that the actual state of charge is maintained in the one of the sections of the non-EV route.

3. The control device according to claim 2, wherein the Electronic Control Unit is further configured to:
   set a lower limit value of the state of charge of the battery,
   change the driving mode that has been set so that the actual state of charge of the battery is maintained or becomes higher when the actual state of charge reaches the lower limit value, and
   lower the lower limit value at the EV route compared with the non-EV route.

4. The control device according to claim 3, wherein the Electronic Control Unit is configured to lower the lower limit value at the EV route only when the actual state of charge does not reach a reference value when the driving mode is maintained at the EV mode at the EV route, and the reference value is lower than the lower limit value at the non-EV route.

5. The control device according to claim 1, wherein the Electronic Control Unit is configured to, when the value of the target state of charge minus the actual state of charge becomes larger than the threshold value, change the driving mode that has been set so that the actual state of charge becomes higher in the one of the sections of the non-EV route.

6. The control device according to claim 5, wherein the Electronic Control Unit is further configured to:
   set a lower limit value of the state of charge of the battery,
   change the driving mode that has been set so that the actual state of charge of the battery is maintained or becomes higher when the actual state of charge reaches the lower limit value, and
   lower the lower limit value at the EV route compared with the non-EV route.

7. The control device according to claim 6, wherein the Electronic Control Unit is configured to lower the lower limit value at the EV route only when the actual state of charge does not reach a reference value when the driving mode is maintained at the EV mode at the EV route, and the reference value is lower than the lower limit value at the non-EV route.

8. The control device according to claim 1, wherein the Electronic Control Unit is configured to (a) change the driving mode that has been set so that the actual state of charge becomes higher in the one of the sections of the non-EV route when the value of the target state of charge at an end point of the non-EV route minus the actual state of charge is larger than a predetermined value, and (b) change the driving mode that has been set so that the actual state of charge is maintained in the one of the sections of the non-EV route when the value of the target state of charge at the end point of the non-EV route minus the actual state of charge is equal to or less than the predetermined value.

9. The control device according to claim 8, wherein the Electronic Control Unit is further configured to:
set a lower limit value of the state of charge of the battery,
change the driving mode that has been set so that the actual state of charge of the battery is maintained or becomes higher when the actual state of charge reaches the lower limit value, and
lower the lower limit value at the EV route compared with the non-EV route.

10. The control device according to claim 9, wherein the Electronic Control Unit is configured to lower the lower limit value at the EV route only when the actual state of charge does not reach a reference value when the driving mode is maintained at the EV mode at the EV route, and the reference value is lower than the lower limit value at the non-EV route.

11. The control device according to claim 1, wherein the Electronic Control Unit is further configured to:
set a lower limit value of the state of charge of the battery,
change the driving mode that has been set so that the actual state of charge of the battery is maintained or becomes higher when the actual state of charge reaches the lower limit value, and
lower the lower limit value at the EV route compared with the non-EV route.

12. The control device according to claim 11, wherein the Electronic Control Unit is configured to lower the lower limit value at the EV route only when the actual state of charge does not reach a reference value when the driving mode is maintained at the EV mode at the EV route, and the reference value is lower than the lower limit value at the non-EV route.

13. A control device of a hybrid vehicle that includes an internal combustion engine in which a catalyst is provided in an exhaust passage, a motor, and a battery supplying electric power to the motor and configured to be charged by an output of the internal combustion engine,
the control device controlling the hybrid vehicle and being configured to:
set in advance a driving mode and a target state of charge of the battery when the hybrid vehicle is being driven;
control outputs of the internal combustion engine and the motor based on the driving mode;
when the hybrid vehicle is being driven from a departure point through at least one via point to a final destination, divide each of a plurality of routes each having the via point as at least one of a starting point and an end point into a plurality of sections, and set the driving mode of all of the sections of at least one route of the plurality of routes to an EV mode in which the internal combustion engine is stopped and drive use power is output by only the motor; and
when a value of the target state of charge minus an actual state of charge of the battery becomes larger than a threshold value, change the driving mode that has been set so that the actual state of charge approaches the target state of charge in one of the sections of a non-EV route, which is one of the routes other than the EV route in which the driving modes of all of the sections are set to the EV mode.

* * * * *